(12) United States Patent
Tang et al.

(10) Patent No.: US 10,746,968 B2
(45) Date of Patent: *Aug. 18, 2020

(54) OPTICAL IMAGING SYSTEM, IMAGING APPARATUS AND ELECTRONIC DEVICE

(71) Applicant: LARGAN PRECISION CO., LTD., Taichung (TW)

(72) Inventors: Hsiang-Chi Tang, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,575

(22) Filed: Feb. 22, 2019

(65) Prior Publication Data

US 2019/0187441 A1    Jun. 20, 2019

Related U.S. Application Data

(63) Continuation of application No. 15/952,478, filed on Apr. 13, 2018, now Pat. No. 10,254,516, which is a (Continued)

(30) Foreign Application Priority Data

Aug. 22, 2016    (TW) .............................. 105126726 A

(51) Int. Cl.
*G02B 13/00* (2006.01)
*G02B 13/18* (2006.01)
(Continued)

(52) U.S. Cl.
CPC ......... *G02B 13/0045* (2013.01); *G02B 5/005* (2013.01); *G02B 5/208* (2013.01);
(Continued)

(58) Field of Classification Search
CPC .... G02B 13/0045; G02B 5/005; G02B 5/208; G02B 9/62; G02B 13/18; G02B 27/0025
(Continued)

(56) References Cited

U.S. PATENT DOCUMENTS

| 4,682,862 A | 7/1987 | Moskovich |
| 4,963,007 A | 10/1990 | Moskovich |

(Continued)

FOREIGN PATENT DOCUMENTS

| CN | 105572848 A | 5/2016 |
| CN | 106154495 A | 11/2016 |

(Continued)

*Primary Examiner* — James R Greece
(74) *Attorney, Agent, or Firm* — Locke Lord LLP; Tim Tingkang Xia, Esq.

(57) ABSTRACT

An optical imaging system includes, in order from an object side to an image side: a first lens element having positive refractive power, a second lens element having negative refractive power, a third lens element, a fourth lens element, a fifth lens element having both an object-side surface and an image-side surface being aspheric, and a sixth lens element having both an object-side surface and an image-side surface being aspheric, wherein the optical imaging system has a total of six lens elements; at least one lens element among the first lens element, the second lens element, the third lens element, the fourth lens element, the fifth lens element, and the sixth lens element has at least one inflection point.

25 Claims, 23 Drawing Sheets

Related U.S. Application Data continuation of application No. 15/364,834, filed on Nov. 30, 2016, now Pat. No. 9,977,224.

(51) Int. Cl.
*G02B 5/00* (2006.01)
*G02B 5/20* (2006.01)
*G02B 9/62* (2006.01)
*G02B 27/00* (2006.01)

(52) U.S. Cl.
CPC ............... *G02B 9/62* (2013.01); *G02B 13/18* (2013.01); *G02B 27/0025* (2013.01)

(58) Field of Classification Search
USPC .................................................. 359/708, 713
See application file for complete search history.

(56) References Cited

U.S. PATENT DOCUMENTS

| | | | |
|---|---|---|---|
| 5,642,229 A | 6/1997 | Kaneko et al. | |
| 9,507,126 B2 | 11/2016 | Tang et al. | |
| 9,726,858 B2 * | 8/2017 | Huang | G02B 13/0045 |
| 2016/0187622 A1 * | 6/2016 | Huang | G02B 15/17 348/335 |
| 2017/0102522 A1 * | 4/2017 | Jo | G02B 5/005 |
| 2017/0146776 A1 | 5/2017 | Kang et al. | |
| 2018/0052303 A1 * | 2/2018 | Tang | G02B 13/18 |
| 2018/0172956 A1 * | 6/2018 | Son | G02B 13/0045 |

FOREIGN PATENT DOCUMENTS

| | | | |
|---|---|---|---|
| JP | 1989072112 | | 3/1989 |
| JP | 1989188814 | | 7/1989 |
| JP | 1989261612 | | 10/1989 |
| JP | 1989263611 | | 10/1989 |
| JP | 1990111909 | | 4/1990 |
| JP | 1990257112 | | 10/1990 |
| JP | 1994281857 | | 10/1994 |
| JP | 1996166539 | | 6/1996 |
| JP | 2000330014 | A | 11/2000 |
| JP | 2015072405 | A | 4/2015 |
| KR | 101813329 | B1 * | 12/2017 |

* cited by examiner

OPTICAL IMAGING SYSTEM, IMAGING APPARATUS AND ELECTRONIC DEVICE

RELATED APPLICATIONS

This application is a Continuation application of U.S. application Ser. No. 15/952,478, filed on Apr. 13, 2018, now approved, which is a Continuation application of U.S. application Ser. No. 15/364,834, filed on Nov. 30, 2016, now patented and claims priority to Taiwan Application Serial Number 105126726, filed on Aug. 22, 2016, which is incorporated by reference herein in its entirety.

BACKGROUND

Technical Field

The present disclosure relates to an optical imaging system and an imaging apparatus, and more particularly, to an optical imaging system and an imaging apparatus applicable to electronic devices.

Description of Related Art

As camera modules being widely utilized, the applications of the camera modules for various intelligent electronics, car devices, recognition devices, entertainment devices, sports devices and smart home systems have become a development trend in the technology. Meanwhile, in order to enrich users' experiences, smart devices with one, two or even more than three lens assemblies are becoming the mainstream in the market and thus lens assemblies with different features to meet requirements in different applications are continuously in development.

Currently available compact lens assemblies for the electronic products often have features like wide view angle and short object distance. However, the optical designs of such lens assemblies failed to meet the consumers' various demands in photo shooting. Conventional optical systems usually use multi-piece structure with spherical glass lenses, which results in having an overly large size of the lens assemblies. Meanwhile, costs of such lens assemblies are also too high to be applied in various devices and products. Therefore, the conventional optical systems have failed to meet the current trend of the technology development.

SUMMARY

According to one aspect of the present disclosure, an optical imaging system, comprising, in order from an object side to an image side: a first lens element having positive refractive power; a second lens element having negative refractive power; a third lens element; a fourth lens element; a fifth lens element having both an object-side surface and an image-side surface being aspheric; and a sixth lens element having both an object-side surface and an image-side surface being aspheric, wherein the optical imaging system has a total of six lens elements; at least one lens element among the first lens element, the second lens element, the third lens element, the fourth lens element, the fifth lens element, and the sixth lens element has at least one inflection point; a sum of axial distances between every two adjacent lens elements of the optical imaging system is $\Sigma AT$, an axial distance between the third lens element and the fourth lens element is T34, a focal length of the first lens element is f1, a focal length of the third lens element is f3, an axial distance between an object-side surface of the first lens element and an image surface is TL, an entrance pupil diameter of the optical imaging system is EPD, and the following conditions are satisfied:

$1.05 < \Sigma AT/T34 < 4.0;$ $|f1/f3| < 1.0;$ $1.0 < TL/EPD < 1.90.$

According to another aspect of the present disclosure, an optical imaging system, comprising, in order from an object side to an image side: a first lens element having positive refractive power; a second lens element having negative refractive power; a third lens element; a fourth lens element; a fifth lens element having both an object-side surface and an image-side surface being aspheric; and a sixth lens element having both an object-side surface and an image-side surface being aspheric, the image-side surface being concave in a paraxial region thereof, and at least one convex shape in an off-axial region on the image-side surface thereof, wherein the optical imaging system has a total of six lens elements; a sum of axial distances between every two adjacent lens elements of the optical imaging system is $\Sigma AT$, an axial distance between the third lens element and the fourth lens element is T34, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the following conditions are satisfied:

$1.10 < \Sigma AT/T34 < 1.80;$ $0.10 < (CT2+CT3+CT4+CT5)/(CT1+CT6) < 1.20.$

According to another aspect of the present disclosure, an imaging apparatus includes the aforementioned optical imaging system and an image sensor disposed on an image surface of the optical imaging system.

According to yet another aspect of the present disclosure, an electronic device includes the aforementioned imaging apparatus.

DETAILED DESCRIPTION

Figure 1A:
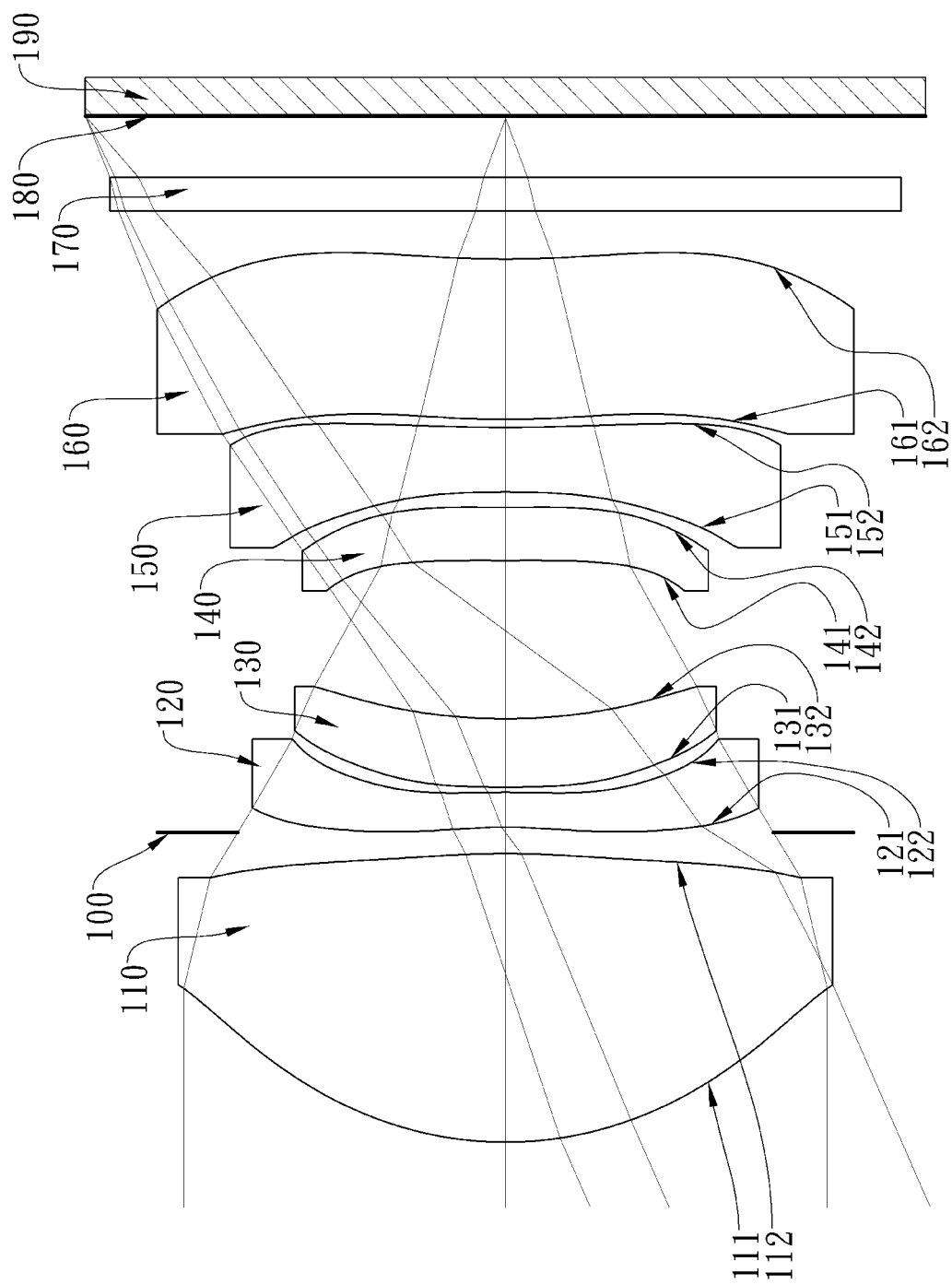
FIG. 1A is a schematic view of an imaging apparatus according to the 1st embodiment of the present disclosure.

The present disclosure provides an optical imaging system including, in order from an object side to an image side, a first lens element, a second lens element, a third lens element, a fourth lens element, a fifth lens element, and a sixth lens element.

The first lens element has positive refractive power to provide the system with the main light convergent ability for lens miniaturization.

The second lens element has negative refractive power. The second lens element may have an object-side surface being concave and an image-side surface being convex such that the aberrations caused by the first lens element can be balanced so as to control the image quality.

The third lens element may have an object-side surface being convex and an image-side surface being concave so as to enhance the astigmatism correcting ability of the system.

The fifth lens element has both an object-side surface and an image-side surface being aspheric and may have negative refractive power so as to balance chromatic aberrations and control the back focal length for various applications. The fifth lens element may have the object-side surface being concave so as to balance the aberrations of the system. The fifth lens element may have the image-side surface being concave so as to help the sixth lens element control the back focal length for the miniaturization of the lens assembly.

The sixth lens element has both an object-side surface and an image-side surface being aspheric and may have positive refractive power so as to favorably control angle of view to meet the common application range. The sixth lens element may have the object-side surface being convex so as to coordinate the configuration of the system to enhance the aberration correcting ability of the sixth lens element. The sixth lens element may have the image-side surface being concave in a paraxial region thereof and at least one convex shape in an off-axial region on the image-side surface thereof so as to reduce the back focal length for compactness of the lens assembly.

The optical imaging system has a total of six lens elements; at least one lens element among the first lens element, the second lens element, the third lens element, the fourth lens element, the fifth lens element, and the sixth lens element has at least one inflection point such that the total track length of the system can be reduced while the aberrations in an off-axial region can be effectively corrected so as to provide satisfactory image quality in a peripheral region.

When a sum of axial distances between every two adjacent lens elements of the optical imaging system is $\Sigma AT$, an axial distance between the third lens element and the fourth lens element is T34, and the following condition is satisfied: $1.05 < \Sigma AT/T34 < 4.0$, the spatial arrangement can be effectively controlled so as to improve the symmetry and the image quality of the system. Preferably, the following condition can be satisfied: $1.10 < \Sigma AT/T34 < 2.50$. Preferably, the following condition can be satisfied: $1.10 < \Sigma AT/T34 < 1.80$.

When a focal length of the first lens element is f1, a focal length of the third lens element is f3, and the following condition is satisfied: $|f1/f3| < 1.0$, the controlling ability at the object side of the system can be strengthened so as to be suitable for a better shooting range. Preferably, the following condition can be satisfied: $|f1/f3| < 0.70$.

When an axial distance between an object-side surface of the first lens element and an image surface is TL, an entrance pupil diameter of the optical imaging system is EPD, and the following condition is satisfied: $1.0 < TL/EPD < 1.90$, the amount of incident light can be increased for improved image brightness while controlling the total track length of the system effectively to avoid an overly large size of the device.

When a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the following condition is satisfied: $0.10 < (CT2+CT3+CT4+CT5)/(CT1+CT6) < 1.20$, the structural strength of the lens element at an outer side of the lens assembly can be increased so as to be suitable for various environments. Preferably, the following condition can be satisfied: $0.20 < (CT2+CT3+CT4+CT5)/(CT1+CT6) < 0.75$.

When a focal length of the optical imaging system is f, the entrance pupil diameter of the optical imaging system is EPD, and the following condition is satisfied: $1.0 < f/EPD < 1.55$, the system can obtain a large aperture so as to improve the light coverage of the lens elements at each field of view and further increase the amount of light retrieved by the system and the image brightness effectively.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, and the following condition is satisfied: $0.20 < (V2+V4+V6)/(V1+V3) < 0.80$, the focal planes at different wavelengths can coincide so as to favorably correct the axial chromatic aberration. When the following condition is satisfied: $0.30 < (V4+V5+V6)/(V1+V3) < 0.95$, the lens elements in the system can be favorably coordinated with a higher degree of freedom in optimizing the shape geometry of the lens elements so as to preferably achieve a better balance of the aberrations.

When a half of a maximal field of view of the imaging capturing lens assembly is HFOV, and the following condition is satisfied: $0.20<\tan(\mathrm{HFOV})<0.50$, the requirements for general applications can be favorably satisfied so as to obtain a more suitable imaging range.

When a curvature radius of the object-side surface of the sixth lens element is R11, a curvature radius of the image-side surface of the sixth lens element is R12, and the following condition is satisfied: $-0.10<(\mathrm{R}11-\mathrm{R}12)/(\mathrm{R}11+\mathrm{R}12)<0.35$, the geometry and the refractive power of the sixth lens element can be effectively controlled such that the sixth lens element becomes a correction lens to enhance its aberration correcting ability.

When a curvature radius of the image-side surface of the third lens element is R6, a curvature radius of an object-side surface of the fourth lens element is R7, and the following condition is satisfied: $-2.0<(\mathrm{R}6+\mathrm{R}7)/(\mathrm{R}6-\mathrm{R}7)<0$, the symmetry of the system can be improved while the system controlling ability at the object side and the aberration correcting ability at the image side can be strengthened.

When an axial distance between the image-side surface of the sixth lens element and the image surface is BL, a central thickness of the first lens element is CT1, and the following condition is satisfied: $0.20<\mathrm{BL}/\mathrm{CT}1<0.90$, the structural strength at the object side can be increased while the back focal length can be controlled so as to reduce the size.

When a vertical distance between a maximum effective diameter position on the object-side surface of the first lens element and an optical axis is Y11, a maximum image height of the optical imaging system is ImgH, and the following condition is satisfied: $0.65<\mathrm{Y}11/\mathrm{ImgH}<1.0$, the incident light range of the system can be effectively controlled so as to improve image brightness and image quality.

When the focal length of the optical imaging system is f, the axial distance between the object-side surface of the first lens element and the image surface is TL, and the following condition is satisfied: $0.80<\mathrm{f}/\mathrm{TL}<1.10$, the angles of views and the total track length of the system can be balanced and suitable for different applications.

When an entrance pupil diameter of the optical imaging system is EPD, a maximum image height of the optical imaging system is ImgH, and the following condition is satisfied: $1.15<\mathrm{EPD}/\mathrm{ImgH}<2.0$, the light retrieving areas can be effectively increased such that the image can be brighter and clearer. Preferably, the following condition can be satisfied: $1.30<\mathrm{EPD}/\mathrm{ImgH}<1.80$.

When a vertical distance between a maximum effective diameter position on the object-side surface of the first lens element and an optical axis is Y11, a vertical distance between a maximum effective diameter position on the image-side surface of the sixth lens element and the optical axis is Y62, and the following condition is satisfied: $0.80<\mathrm{Y}11/\mathrm{Y}62<1.35$, the sizes of the lens elements can be balanced so as to increase the symmetry of the lens assembly and favor the bearing and lapping between the lens elements.

Figure 8:
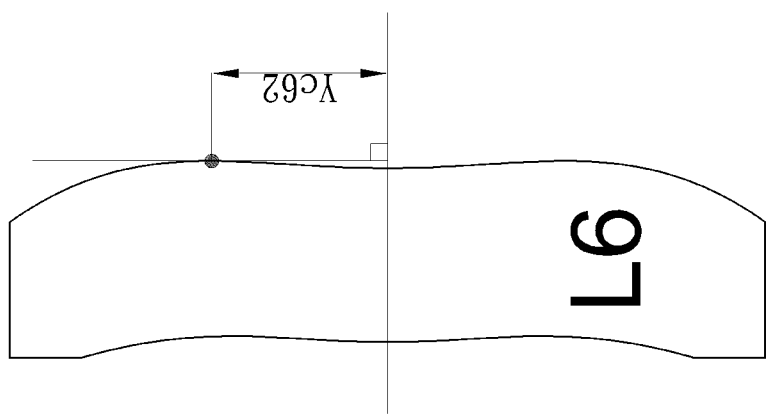
FIG. 8 is a schematic view showing the distance represented by the parameter Yc62 of an optical imaging system of the present disclosure.

Please refer to FIG. 8. When a vertical distance between an off-axial critical point on the image-side surface of the sixth lens element (L6) and the optical axis is Yc62, the focal length of the optical imaging system is f, and the following condition is satisfied: $0.05<\mathrm{Yc}62/\mathrm{f}<0.70$, angles of the light at a peripheral region can be favorably controlled so as to correct aberrations in an off-axial region.

When a curvature radius of the object-side surface of the first lens element is R1, the central thickness of the first lens element is CT1, and the following condition is satisfied: $0.70<\mathrm{R}1/\mathrm{CT}1<1.50$, the thickness and the curvature configuration of the first lens element can be balanced so as to improve the system stability.

When the axial distance between the object-side surface of the first lens element and the image surface is TL, and the following condition is satisfied: $3.0~\mathrm{mm}<\mathrm{TL}<7.0~\mathrm{mm}$, the total track length of the system can be effectively controlled so as to favor the miniaturized design.

The optical imaging system may further comprise an aperture stop. When the axial distance between the object-side surface of the first lens element and the image surface is TL, an axial distance between the aperture stop and the image surface is SL, and the following condition is satisfied: $0.65<\mathrm{SL}/\mathrm{TL}<0.85$, the positioning of the aperture stop can be balanced so as to effectively control view angles while adjusting the incident angle of the image surface and increasing the image brightness for a wider range of applications.

Figure 9:
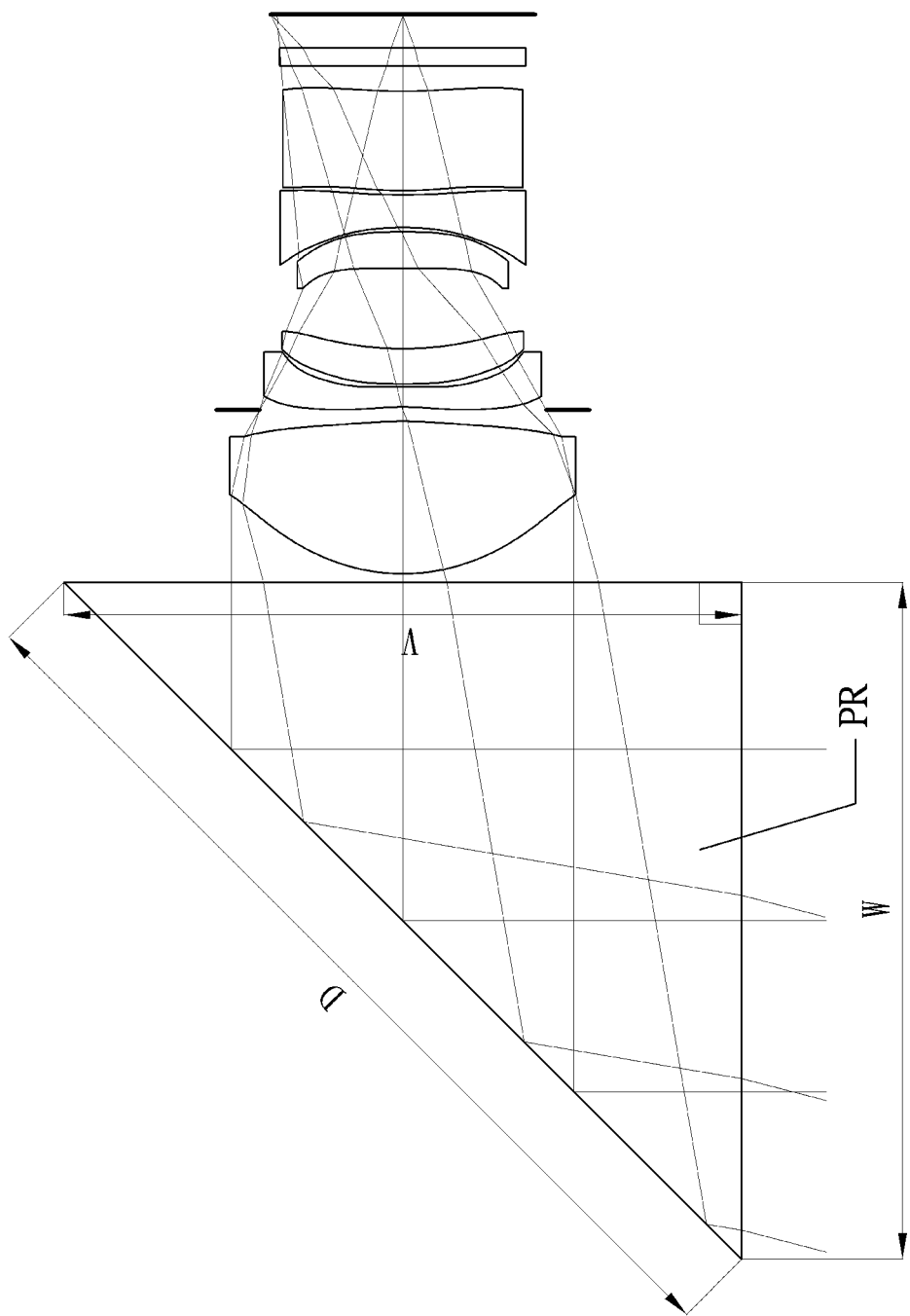
FIG. 9 is a schematic view showing an imaging apparatus with a triangular prism of the present disclosure.
Figure 10:
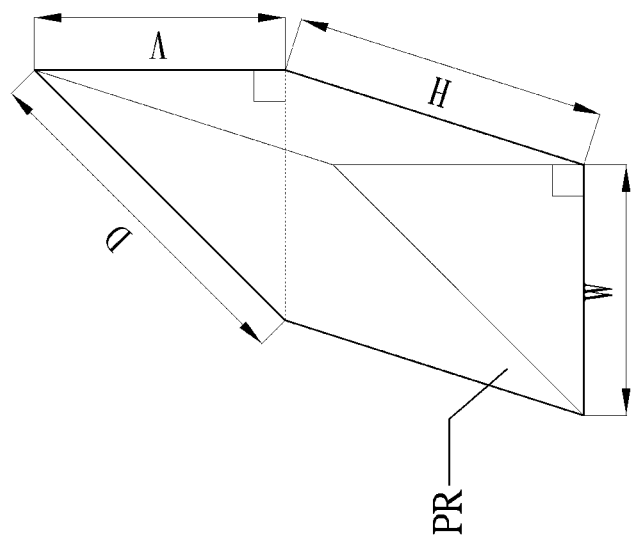
FIG. 10 is a perspective view of the triangular prism shown in FIG. 9.

Please refer to FIG. 9. As shown in the figure, the optical imaging system of the present disclosure may further comprise a reflective component PR at the object side of the first lens element along the optical axis such that the direction of the optical axis can be effectively controlled and the spatial arrangement of the system can be more flexible to meet different requirements. The reflective component PR can be a mirror or a prism. Please refer to FIG. 10. When the reflective component PR is a triangular prism; a height of the triangular prism is H, a length of a ramp of the triangular prism is D, and the following condition is satisfied: $0.90<\mathrm{H}/\mathrm{D}<1.35$, the prism can be kept in the smallest volume without modifying the imaging conditions.

According to the optical imaging system of the present disclosure, the lens elements thereof can be made of glass or plastic material. When the lens elements are made of glass material, the distribution of the refractive power of the optical imaging system may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the optical imaging system can be effectively reduced.

According to the optical imaging system of the present disclosure, the optical imaging system can include at least one stop, such as an aperture stop, a glare stop or a field stop, so as to favorably reduce the amount of stray light and thereby improving the image quality.

According to the optical imaging system of the present disclosure, an aperture stop can be configured as a front stop or a middle stop. A front stop disposed between an imaged object and the first lens element can provide a longer distance between an exit pupil of the optical imaging system and the image surface so that the generated telecentric effect can improve the image-sensing efficiency of an image sensor, such as a CCD or CMOS sensor. A middle stop disposed between the first lens element and the image surface is favorable for enlarging the field of view of the optical imaging system, thereby providing the optical imaging system with the advantage of a wide-angle lens.

According to the optical imaging system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical imaging system of the present disclosure, the image surface of the optical imaging system, based on the corresponding image sensor, can be a plane or a curved surface with an arbitrary curvature, especially a curved surface being concave facing towards the object side.

The optical imaging system of the present disclosure can be optionally applied to moving focus optical systems. According to the optical imaging system of the present disclosure, the optical imaging system features a good correction capability and high image quality, and can be applied to 3D (three-dimensional) image capturing applications and electronic devices, such as digital cameras, mobile devices, smartphones, digital tablets, smart TVs, network surveillance devices, motion sensing game consoles, driving recording systems, rear view camera systems, drone cameras and wearable devices.

According to the present disclosure, an imaging apparatus includes the aforementioned optical imaging system and an image sensor, wherein the image sensor is disposed on or near an image surface of the optical imaging system. Therefore, the design of the optical imaging system enables the imaging apparatus to achieve the best image quality. Preferably, the optical imaging system can further include a barrel member, a holder member or a combination thereof. Also, the imaging apparatus can further include an optical image stabilizer (OIS) to coordinate with the optical imaging system so as to provide a better imaging quality.

Figure 11A:
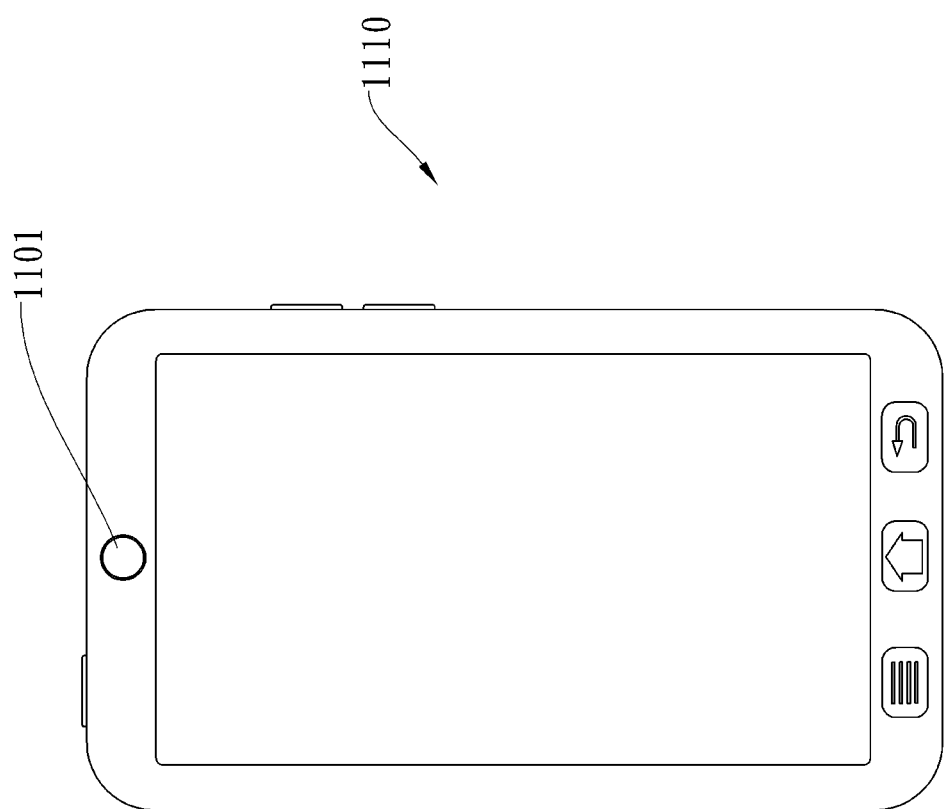
FIG. 11A shows a smartphone with an imaging apparatus of the present disclosure installed therein.
Figure 11B:
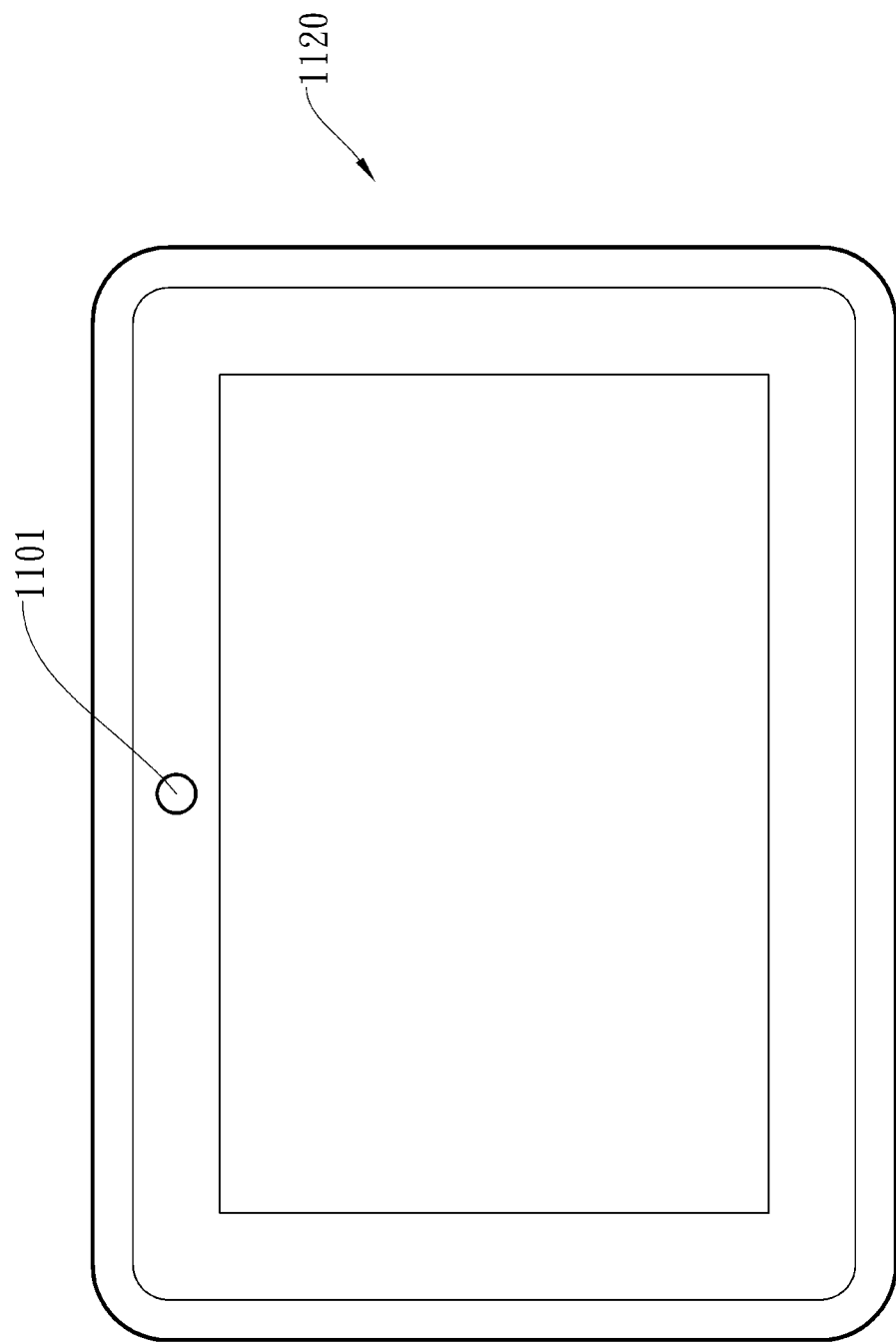
FIG. 11B shows a tablet with an imaging apparatus of the present disclosure installed therein.
Figure 11C:
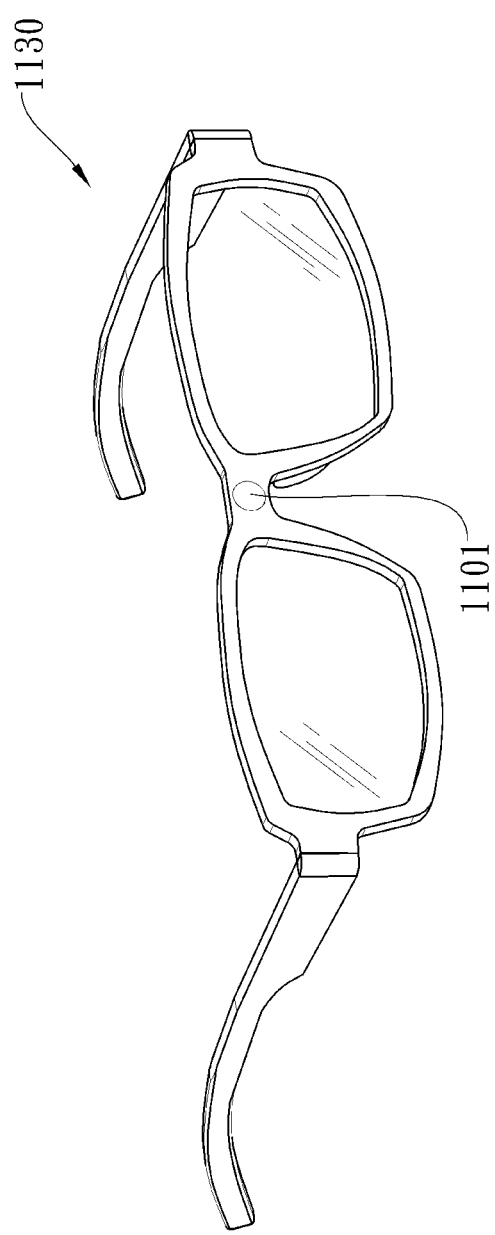
FIG. 11C shows a wearable device with an imaging apparatus of the present disclosure installed therein.
Figure 12A:
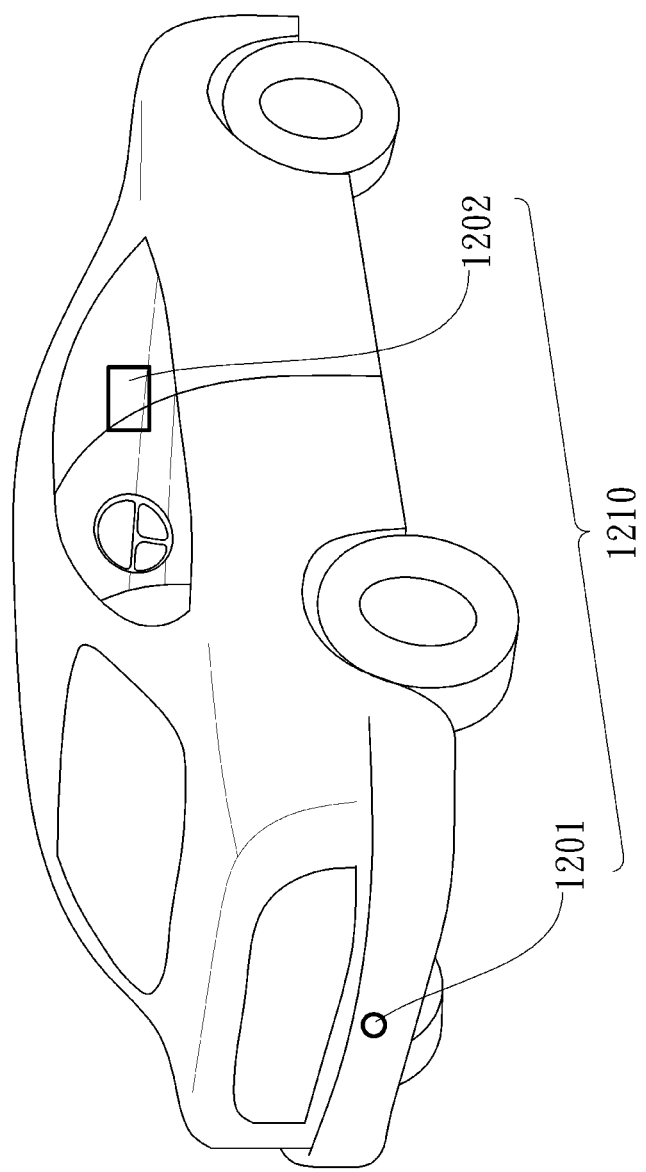
FIG. 12A shows a rear view camera with an imaging apparatus of the present disclosure installed therein.
Figure 12B:
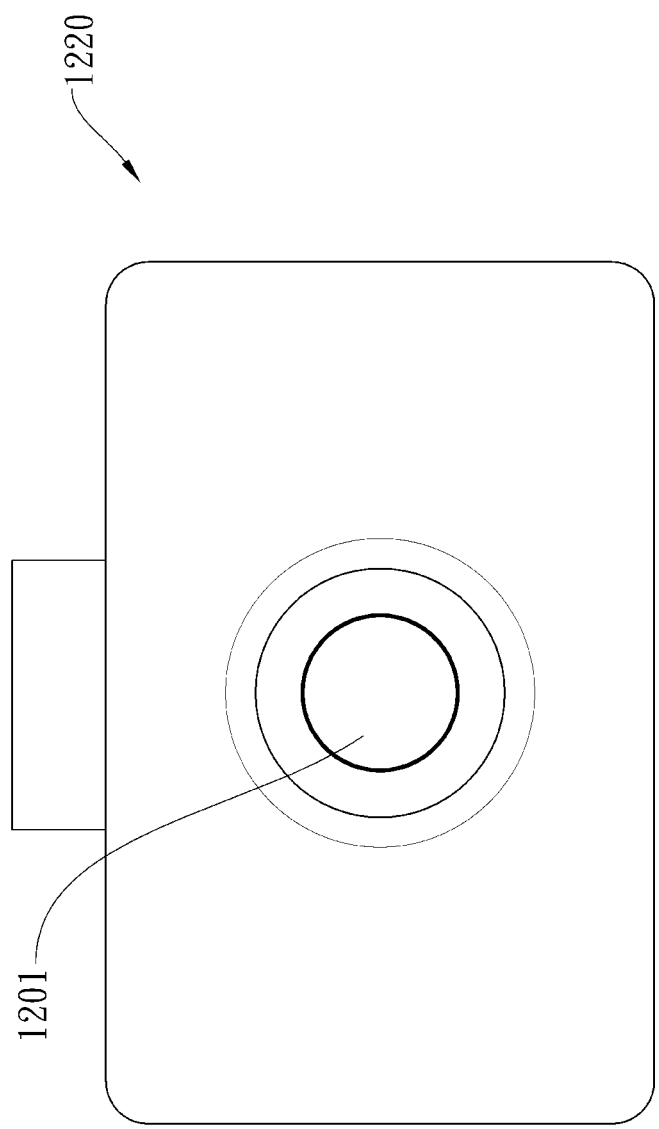
FIG. 12B shows a driving recording system with an imaging apparatus of the present disclosure installed therein.
Figure 12C:
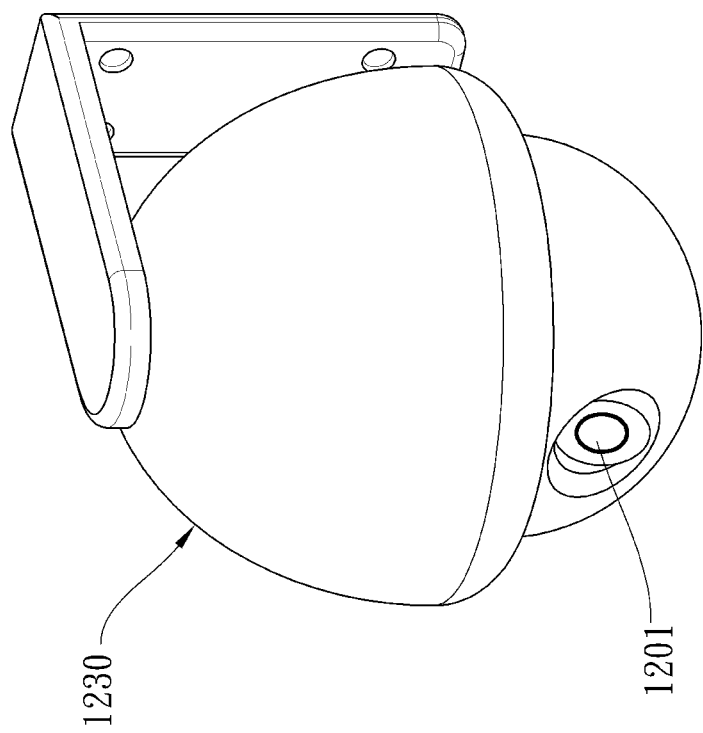
FIG. 12C shows a surveillance camera with an imaging apparatus of the present disclosure installed therein.

Please refer to FIG. 11A, FIG. 11B and FIG. 11C, an imaging apparatus 1101 may be installed in an electronic device including, but not limited to, a smartphone 1110, a tablet 1120, or a wearable device 1130. Please refer to FIG. 12A, FIG. 12B and FIG. 12C, an imaging apparatus 1201 may be installed (optionally with a display screen 1202) in an electronic device including, but not limited to, a rear view camera 1210, a driving recording system 1220, or a surveillance camera 1230. The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-7th specific embodiments are provided for further explanations.

1st Embodiment

Figure 1B:
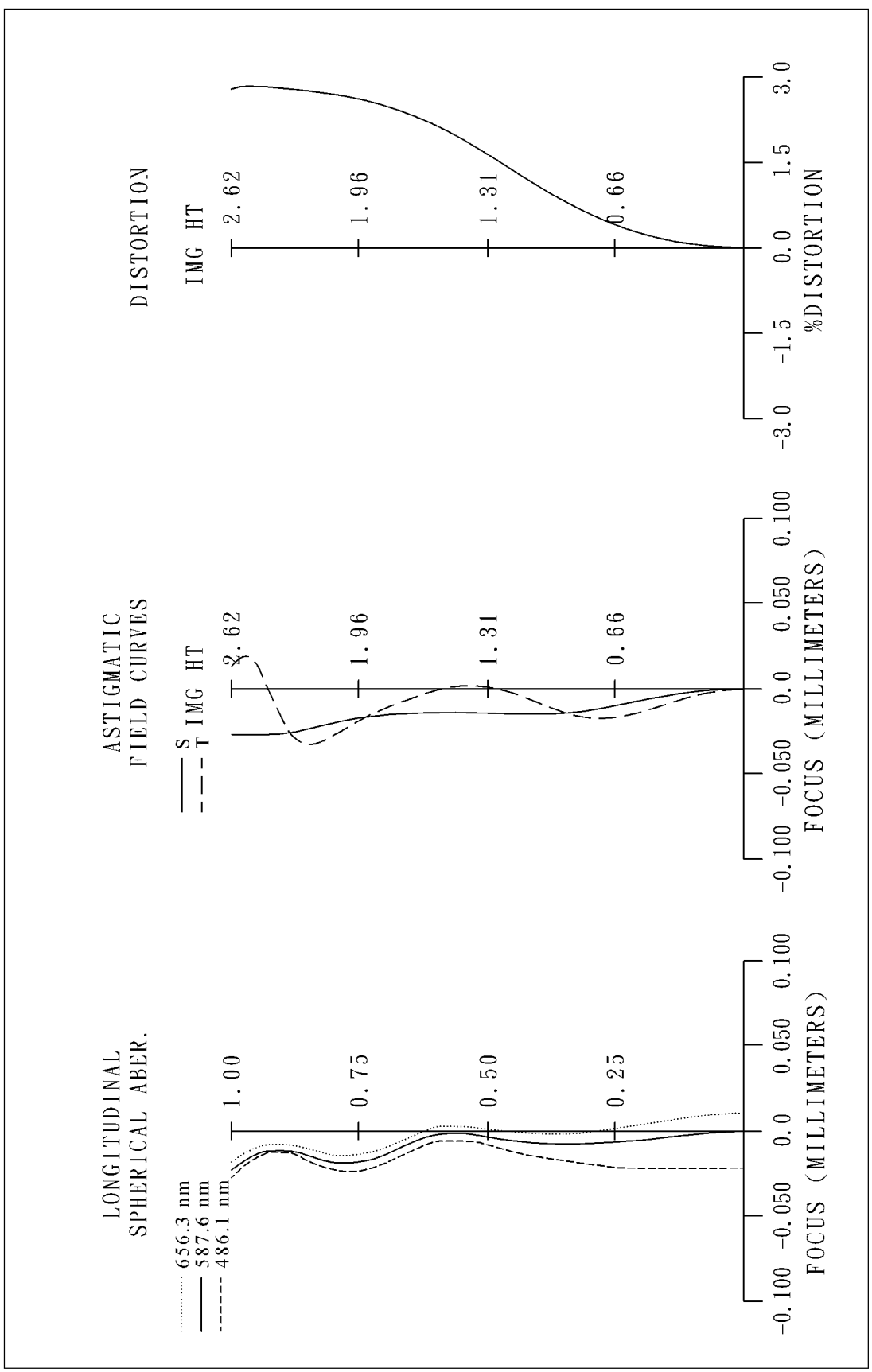
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an optical imaging system (not otherwise herein labeled) of the present disclosure and an image sensor 190. The optical imaging system includes, in order from an object side to an image side, a first lens element 110, an aperture stop 100, a second lens element 120, a third lens element 130, a fourth lens element 140, a fifth lens element 150, and a sixth lens element 160.

The first lens element 110 with positive refractive power has an object-side surface 111 being convex in a paraxial region thereof, an image-side surface 112 being convex in a paraxial region thereof, both the object-side surface 111 and the image-side surface 112 being aspheric, and at least one inflection point on the object-side surface 111. The first lens element 110 is made of plastic material.

The second lens element 120 with negative refractive power has an object-side surface 121 being concave in a paraxial region thereof, an image-side surface 122 being convex in a paraxial region thereof, both the object-side surface 121 and the image-side surface 122 being aspheric, and at least one inflection point on each of the object-side surface 121 and the image-side surface 122. The second lens element 120 is made of plastic material.

The third lens element 130 with negative refractive power has an object-side surface 131 being convex in a paraxial region thereof, an image-side surface 132 being concave in a paraxial region thereof, and both the object-side surface 131 and the image-side surface 132 being aspheric. The third lens element 130 is made of plastic material.

The fourth lens element 140 with negative refractive power has an object-side surface 141 being convex in a paraxial region thereof, an image-side surface 142 being concave in a paraxial region thereof, and both the object-side surface 141 and the image-side surface 142 being aspheric. The fourth lens element 140 is made of plastic material.

The fifth lens element 150 with negative refractive power has an object-side surface 151 being concave in a paraxial region thereof, an image-side surface 152 being concave in a paraxial region thereof, both the object-side surface 151 and the image-side surface 152 being aspheric, and at least one inflection point on the image-side surface 152. The fifth lens element 150 is made of plastic material.

The sixth lens element 160 with positive refractive power has an object-side surface 161 being convex in a paraxial region thereof, an image-side surface 162 being concave in a paraxial region thereof, both the object-side surface 161 and the image-side surface 162 being aspheric, and at least one inflection point on each of the object-side surface 161 and the image-side surface 162. The sixth lens element 160 is made of plastic material.

The optical imaging system further includes an IR cut filter 170 located between the sixth lens element 160 and an image surface 180. The IR cut filter 170 is made of glass material and will not affect the focal length of the optical imaging system. The image sensor 190 is disposed on or near the image surface 180 of the optical imaging system.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
f = 5.82 mm, Fno = 1.45, HFOV = 23.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.245 | ASP | 1.800 | Plastic | 1.535 | 55.8 | 3.22 |
| 2 | | −5.337 | ASP | 0.132 | | | | |
| 3 | Ape. Stop | Plano | | 0.033 | | | | |
| 4 | Lens 2 | −3.289 | ASP | 0.217 | Plastic | 1.671 | 19.5 | −9.38 |
| 5 | | −7.072 | ASP | 0.032 | | | | |
| 6 | Lens 3 | 7.610 | ASP | 0.428 | Plastic | 1.535 | 55.8 | −12.93 |
| 7 | | 3.552 | ASP | 0.986 | | | | |
| 8 | Lens 4 | 62.858 | ASP | 0.332 | Plastic | 1.639 | 23.3 | −34.72 |
| 9 | | 16.358 | ASP | 0.096 | | | | |
| 10 | Lens 5 | −8.725 | ASP | 0.403 | Plastic | 1.515 | 56.5 | −9.20 |
| 11 | | 10.513 | ASP | 0.050 | | | | |
| 12 | Lens 6 | 5.132 | ASP | 1.000 | Plastic | 1.639 | 23.3 | 41.36 |
| 13 | | 5.885 | ASP | 0.300 | | | | |
| 14 | IR Cut Filter | Plano | | 0.210 | Glass | 1.517 | 64.2 | — |
| 15 | | Plano | | 0.383 | | | | |
| 16 | Image Surface | Plano | | — | | | | |

Note:
Reference wavelength is d-line 587.6 nm.
The effective radius of Surface 1 is 2.040 mm.
The effective radius of Surface 10 is 1.450 mm.

TABLE 2

Aspheric Coefficients

| | Surface # | | | |
|---|---|---|---|---|
| | 1 | 2 | 4 | 5 |
| k = | −1.3122E+00 | 5.6214E+00 | −1.0391E+01 | 1.9173E+01 |
| A4 = | 1.2002E−02 | 8.9744E−02 | 2.4400E−01 | 3.6588E−01 |
| A6 = | −1.7371E−03 | −5.4131E−02 | −2.0886E−01 | −2.2793E−01 |
| A8 = | 1.1928E−03 | 1.9192E−02 | 9.5009E−02 | 2.4860E−02 |
| A10 = | −2.8788E−04 | −3.6228E−03 | −2.0596E−02 | 3.7796E−02 |
| A12 = | 5.3670E−06 | 2.9533E−04 | 1.7734E−03 | −9.2410E−03 |

| | Surface # | | | |
|---|---|---|---|---|
| | 6 | 7 | 8 | 9 |
| k = | −3.5791E+01 | −2.2390E+01 | −9.0000E+01 | 7.0391E+01 |
| A4 = | 1.9174E−01 | 4.6182E−02 | −1.3626E−01 | −2.9257E−01 |
| A6 = | −5.7826E−02 | 1.8916E−02 | 1.0408E−01 | 3.1066E−01 |
| A8 = | −8.2370E−02 | −4.7889E−02 | −1.6734E−01 | −3.3447E−01 |
| A10 = | 7.4505E−02 | 2.8109E−02 | 1.4673E−01 | 2.5471E−01 |
| A12 = | −1.5771E−02 | −6.6234E−03 | −8.8781E−02 | −1.1315E−01 |
| A14 = | −1.3313E−04 | | 2.2879E−02 | 2.1227E−02 |

| | Surface # | | | |
|---|---|---|---|---|
| | 10 | 11 | 12 | 13 |
| k = | −2.1724E−01 | −1.3995E+01 | −2.6841E+01 | 4.9107E+00 |
| A4 = | −1.9601E−01 | −3.2794E−02 | −5.2900E−02 | −5.2188E−02 |
| A6 = | 2.2850E−01 | 1.0855E−02 | −2.2307E−02 | 3.7723E−03 |
| A8 = | −2.2493E−01 | 3.3426E−03 | 5.0558E−02 | 1.2067E−03 |
| A10 = | 1.7462E−01 | −6.4941E−03 | −3.4376E−02 | −8.2835E−04 |
| A12 = | −7.7830E−02 | 2.2008E−03 | 1.1692E−02 | 1.7078E−04 |
| A14 = | 1.3550E−02 | −2.5089E−04 | −1.9832E−03 | −1.1495E−05 |
| A16 = | | | 1.3293E−04 | −2.0067E−07 |

The equation of the aspheric surface profiles is expressed as follows:

$$X(Y) = (Y^2/R)/(1 + sqrt(1-(1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical imaging system is f, an f-number of the optical imaging system is Fno, a half of a maximal field of view of the optical imaging system is HFOV, and these parameters have the following values: f=5.82 mm; Fno=1.45; and HFOV=23.7 degrees.

In the 1st embodiment, an Abbe number of the first lens element 110 is V1, an Abbe number of the second lens element 120 is V2, an Abbe number of the third lens element 130 is V3, an Abbe number of the fourth lens element 140 is V4, an Abbe number of the sixth lens element 160 is V6, and they satisfy the condition: (V2+V4+V6)/(V1+V3)=0.59.

In the 1st embodiment, the Abbe number of the first lens element 110 is V1, the Abbe number of the third lens element 130 is V3, the Abbe number of the fourth lens element 140 is V4, an Abbe number of the fifth lens element 150 is V5, the Abbe number of the sixth lens element 160 is V6, and they satisfy the condition: (V4+V5+V6)/(V1+V3)=0.92.

In the 1st embodiment, a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, and they satisfy the condition: (CT2+CT3+CT4+CT5)/(CT1+CT6)=0.49.

In the 1st embodiment, a sum of axial distances between every two adjacent lens elements of the optical imaging system is ΣAT, an axial distance between the third lens element 130 and the fourth lens element 140 is T34, and they satisfy the condition: ΣAT/T34=1.35.

In the 1st embodiment, a curvature radius of the image-side surface 132 of the third lens element 130 is R6, a curvature radius of the object-side surface 141 of the fourth lens element 140 is R7, and they satisfy the condition: (R6+R7)/(R6−R7)=−1.12.

In the 1st embodiment, a curvature radius of the object-side surface 161 of the sixth lens element 160 is R11, a curvature radius of the image-side surface 162 of the sixth lens element 160 is R12, and they satisfy the condition: (R11−R12)/(R11+R12)=−0.07.

In the 1st embodiment, a focal length of the first lens element 110 is f1, a focal length of the third lens element 130 is f3, and they satisfy the condition: |f1/f3|=0.25.

In the 1st embodiment, a curvature radius of the object-side surface 111 of the first lens element 110 is R1, the central thickness of the first lens element 110 is CT1, and they satisfy the condition: R1/CT1=1.25.

In the 1st embodiment, an axial distance between the image-side surface 162 of the sixth lens element 160 and the image surface 180 is BL, the central thickness of the first lens element is CT1, and they satisfy the condition: BL/CT1=0.50.

In the 1st embodiment, a half of the maximal field of view of the optical imaging system is HFOV, and it satisfies the condition: tan(HFOV)=0.44.

In the 1st embodiment, an axial distance between the object-side surface 111 of the first lens element 110 and the image surface 180 is TL, and it satisfies the condition: TL=6.40 mm.

In the 1st embodiment, the axial distance between the object-side surface 111 of the first lens element 110 and the image surface 180 is TL, an axial distance between the aperture stop 100 and the image surface 180 is SL, and they satisfy the condition: SL/TL=0.70.

In the 1st embodiment, the focal length of the optical imaging system is f, the axial distance between the object-side surface 111 of the first lens element 110 and the image surface 180 is TL, and they satisfy the condition: f/TL=0.91.

In the 1st embodiment, an entrance pupil diameter of the optical imaging system is EPD, a maximum image height of the optical imaging system is ImgH, and they satisfy the condition: EPD/ImgH=1.53.

In the 1st embodiment, a vertical distance between a maximum effective diameter position on the object-side surface 111 of the first lens element 110 and an optical axis is Y11, the maximum image height of the optical imaging system is ImgH, and they satisfy the condition: Y11/ImgH=0.78.

In the 1st embodiment, the vertical distance between a maximum effective diameter position on the object-side surface 111 of the first lens element 110 and the optical axis is Y11, a vertical distance between a maximum effective diameter position on the image-side surface 162 of the sixth lens element 160 and the optical axis is Y62, and they satisfy the condition: Y11/Y62=0.94.

In the 1st embodiment, a vertical distance between an off-axial critical point on the image-side surface 162 of the sixth lens element 160 and the optical axis is Yc62, the focal length of the optical imaging system is f, and they satisfy the condition: Yc62/f=0.17.

In the 1st embodiment, the axial distance between the object-side surface 111 of the first lens element 110 and the image surface 180 is TL, the entrance pupil diameter of the optical imaging system is EPD, and they satisfy the condition: TL/EPD=1.60.

In the 1st embodiment, the focal length of the optical imaging system is f, the entrance pupil diameter of the optical imaging system is EPD, and they satisfy the condition: f/EPD=1.45.

2nd Embodiment

Figure 2A:
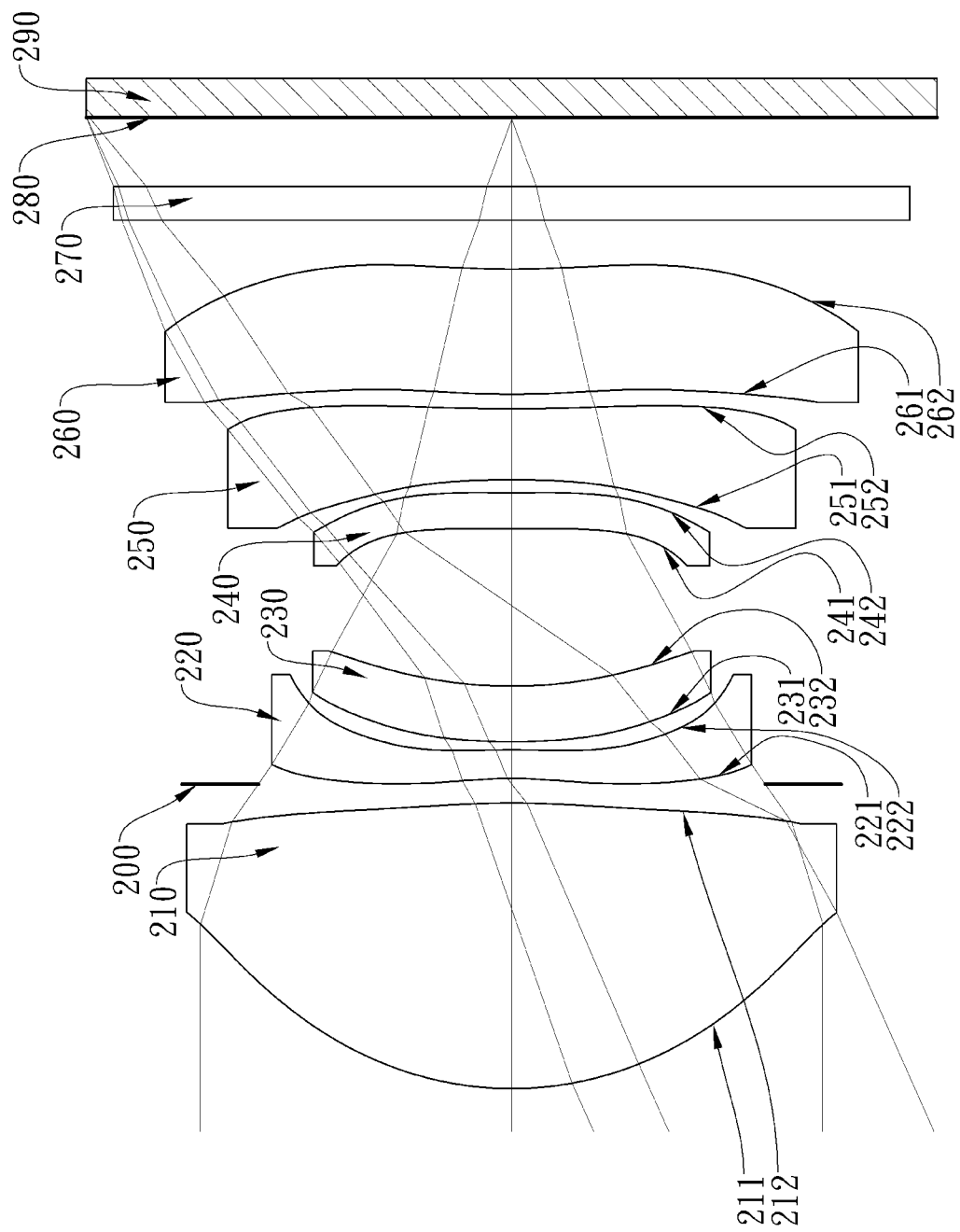
FIG. 2A is a schematic view of an imaging apparatus according to the 2nd embodiment of the present disclosure.
Figure 2B:
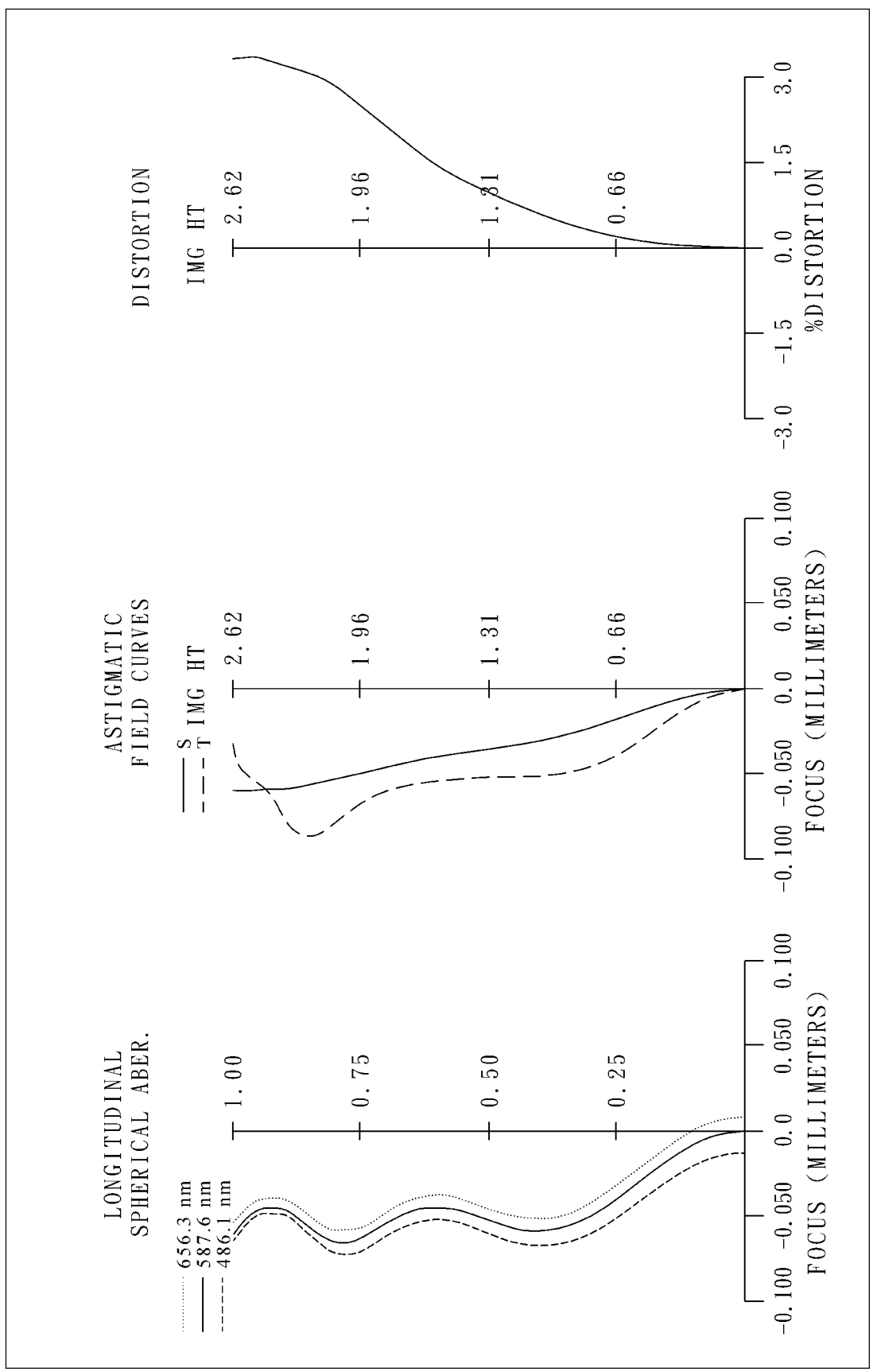
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an optical imaging system (not otherwise herein labeled) of the present disclosure and an image sensor 290. The optical imaging system includes, in order from an object side to an image side, a first lens element 210, an aperture stop 200, a second lens element 220, a third lens element 230, a fourth lens element 240, a fifth lens element 250, and a sixth lens element 260.

The first lens element 210 with positive refractive power has an object-side surface 211 being convex in a paraxial region thereof, an image-side surface 212 being convex in a paraxial region thereof, both the object-side surface 211 and the image-side surface 212 being aspheric, and at least one inflection point on the object-side surface 211. The first lens element 210 is made of plastic material.

The second lens element 220 with negative refractive power has an object-side surface 221 being concave in a paraxial region thereof, an image-side surface 222 being convex in a paraxial region thereof, both the object-side surface 221 and the image-side surface 222 being aspheric, and at least one inflection point on each of the object-side surface 221 and the image-side surface 222. The second lens element 220 is made of plastic material.

The third lens element 230 with negative refractive power has an object-side surface 231 being convex in a paraxial region thereof, an image-side surface 232 being concave in a paraxial region thereof, and both the object-side surface 231 and the image-side surface 232 being aspheric. The third lens element 230 is made of plastic material.

The fourth lens element 240 with negative refractive power has an object-side surface 241 being convex in a paraxial region thereof, an image-side surface 242 being concave in a paraxial region thereof, both the object-side surface 241 and the image-side surface 242 being aspheric, and at least one inflection point on the image-side surface 242. The fourth lens element 240 is made of plastic material.

The fifth lens element 250 with negative refractive power has an object-side surface 251 being concave in a paraxial region thereof, an image-side surface 252 being concave in a paraxial region thereof, both the object-side surface 251 and the image-side surface 252 being aspheric, and at least one inflection point on the image-side surface 252. The fifth lens element 250 is made of plastic material.

The sixth lens element 260 with positive refractive power has an object-side surface 261 being convex in a paraxial region thereof, an image-side surface 262 being concave in a paraxial region thereof, both the object-side surface 261 and the image-side surface 262 being aspheric, and at least one inflection point on each of the object-side surface 261 and the image-side surface 262. The sixth lens element 260 is made of plastic material.

The optical imaging system further includes an IR cut filter 270 located between the sixth lens element 260 and an image surface 280. The IR cut filter 270 is made of glass material and will not affect the focal length of the optical imaging system. The image sensor 290 is disposed on or near the image surface 280 of the optical imaging system.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 5.75 mm, Fno = 1.50, HFOV = 24.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.071 | ASP | 1.759 | Plastic | 1.545 | 56.0 | 3.01 |
| 2 | | −5.479 | ASP | 0.117 | | | | |
| 3 | Ape. Stop | Plano | | 0.035 | | | | |
| 4 | Lens 2 | −2.708 | ASP | 0.175 | Plastic | 1.671 | 19.5 | −6.62 |
| 5 | | −7.118 | ASP | 0.051 | | | | |
| 6 | Lens 3 | 4.159 | ASP | 0.342 | Plastic | 1.535 | 55.8 | −15.54 |
| 7 | | 2.693 | ASP | 0.971 | | | | |
| 8 | Lens 4 | 59.577 | ASP | 0.220 | Plastic | 1.671 | 19.5 | −43.63 |
| 9 | | 19.596 | ASP | 0.080 | | | | |
| 10 | Lens 5 | −8.075 | ASP | 0.438 | Plastic | 1.535 | 55.8 | −8.39 |
| 11 | | 10.282 | ASP | 0.090 | | | | |
| 12 | Lens 6 | 5.078 | ASP | 0.771 | Plastic | 1.671 | 19.5 | 44.36 |
| 13 | | 5.750 | ASP | 0.300 | | | | |
| 14 | IR Cut Filter | Plano | | 0.210 | Glass | 1.517 | 64.2 | — |
| 15 | | Plano | | 0.425 | | | | |
| 16 | Image Surface | Plano | | — | | | | |

Note:
Reference wavelength is d-line 587.6 nm.
The effective radius of Surface 1 is 2.000 mm.
The effective radius of Surface 5 is 1.365 mm.
The effective radius of Surface 10 is 1.450 mm.

TABLE 4

| Aspheric Coefficients | | | | |
|---|---|---|---|---|
| | Surface # | | | |
| | 1 | 2 | 4 | 5 |
| k = | −1.1052E+00 | 6.2810E+00 | −2.2955E+01 | 8.1165E−01 |
| A4 = | 1.3724E−02 | 8.7611E−02 | 2.3258E−01 | 3.6599E−01 |
| A6 = | −1.8086E−03 | −5.2441E−02 | −2.0858E−01 | −2.2855E−01 |

TABLE 4-continued

| Aspheric Coefficients | | | | |
|---|---|---|---|---|
| A8 = | 1.1716E−03 | 1.9064E−02 | 9.7512E−02 | 2.4594E−02 |
| A10 = | −1.1601E−04 | −3.7219E−03 | −2.1130E−02 | 3.7500E−02 |
| A12 = | −3.4833E−05 | 3.1480E−04 | 1.8020E−03 | −7.9553E−03 |

| | Surface # | | | |
|---|---|---|---|---|
| | 6 | 7 | 8 | 9 |
| k = | −7.3611E+01 | −1.9149E+01 | 9.0000E+01 | −9.0000E+01 |
| A4 = | 1.8303E−01 | 7.2903E−02 | −1.5262E−01 | −2.9146E−01 |
| A6 = | −4.7103E−02 | 2.8313E−04 | 5.8495E−02 | 3.1012E−01 |
| A8 = | −8.6790E−02 | −5.5405E−02 | −1.3748E−01 | −3.3466E−01 |
| A10 = | 7.3768E−02 | 3.9495E−02 | 1.4137E−01 | 2.5535E−01 |
| A12 = | −1.4003E−02 | −9.7164E−03 | −9.8514E−02 | −1.1269E−01 |
| A14 = | −4.0795E−04 | | 1.9012E−02 | 2.1501E−02 |
| A16 = | | | 5.4173E−03 | 1.6089E−05 |

| | Surface # | | | |
|---|---|---|---|---|
| | 10 | 11 | 12 | 13 |
| k = | −1.8930E+01 | 1.6677E+00 | −1.5018E+01 | 4.9481E+00 |
| A4 = | −1.8761E−01 | −2.6878E−02 | −8.0700E−02 | −9.1967E−02 |
| A6 = | 2.3019E−01 | −1.7264E−02 | −2.2470E−03 | 2.9390E−02 |
| A8 = | −2.2415E−01 | 2.4479E−02 | 4.2119E−02 | −1.4276E−02 |
| A10 = | 1.7453E−01 | −1.3402E−02 | −2.7334E−02 | 7.0421E−03 |
| A12 = | −7.7923E−02 | 3.3993E−03 | 8.0320E−03 | −2.1909E−03 |
| A14 = | 1.3478E−02 | −3.4839E−04 | −1.1457E−03 | 3.4772E−04 |
| A16 = | | | 6.3286E−05 | −2.1861E−05 |

In the 2nd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated the table below.

| 2nd Embodiment | | | |
|---|---|---|---|
| f [mm] | 5.75 | BL/CT1 | 0.53 |
| Fno. | 1.50 | tan(HFOV) | 0.44 |
| HFOV [deg.] | 24.0 | TL [mm] | 5.98 |
| (V2 + V4 + V6)/(V1 + V3) | 0.52 | SL/TL | 0.69 |
| (V4 + V5 + V6)/(V1 + V3) | 0.85 | f/TL | 0.96 |
| (CT2 + CT3 + CT4 + CT5)/(CT1 + CT6) | 0.46 | EPD/ImgH | 1.46 |
| ΣAT/T34 | 1.38 | Y11/ImgH | 0.76 |
| (R6 + R7)/(R6 − R7) | −1.09 | Y11/Y62 | 0.95 |
| (R11 − R12)/(R11 + R12) | −0.06 | Yc62/f | 0.14 |
| |f1/f3| | 0.19 | TL/EPD | 1.56 |
| R1/CT1 | 1.18 | f/EPD | 1.50 |

3rd Embodiment

Figure 3A:
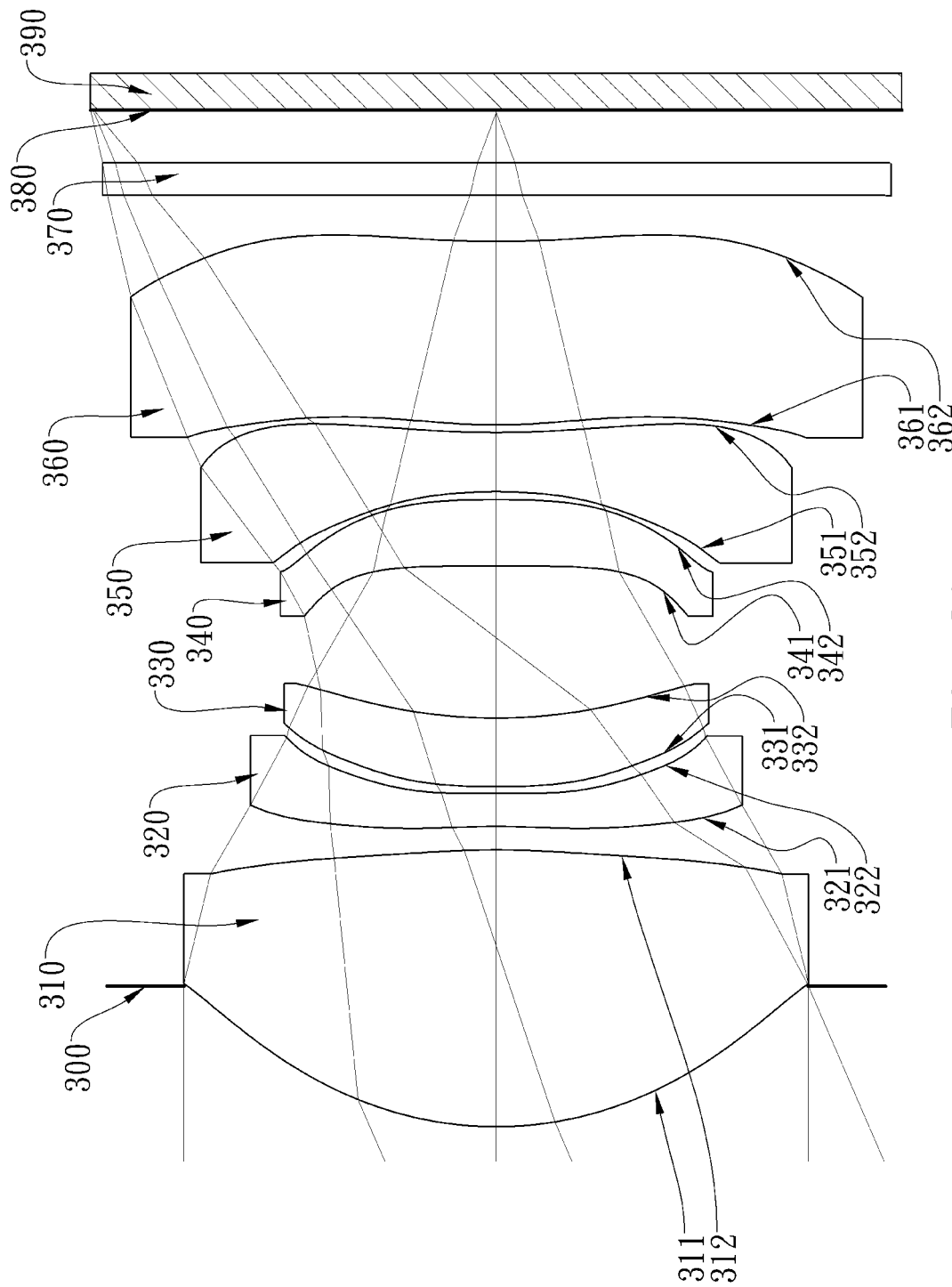
FIG. 3A is a schematic view of an imaging apparatus according to the 3rd embodiment of the present disclosure.
Figure 3B:
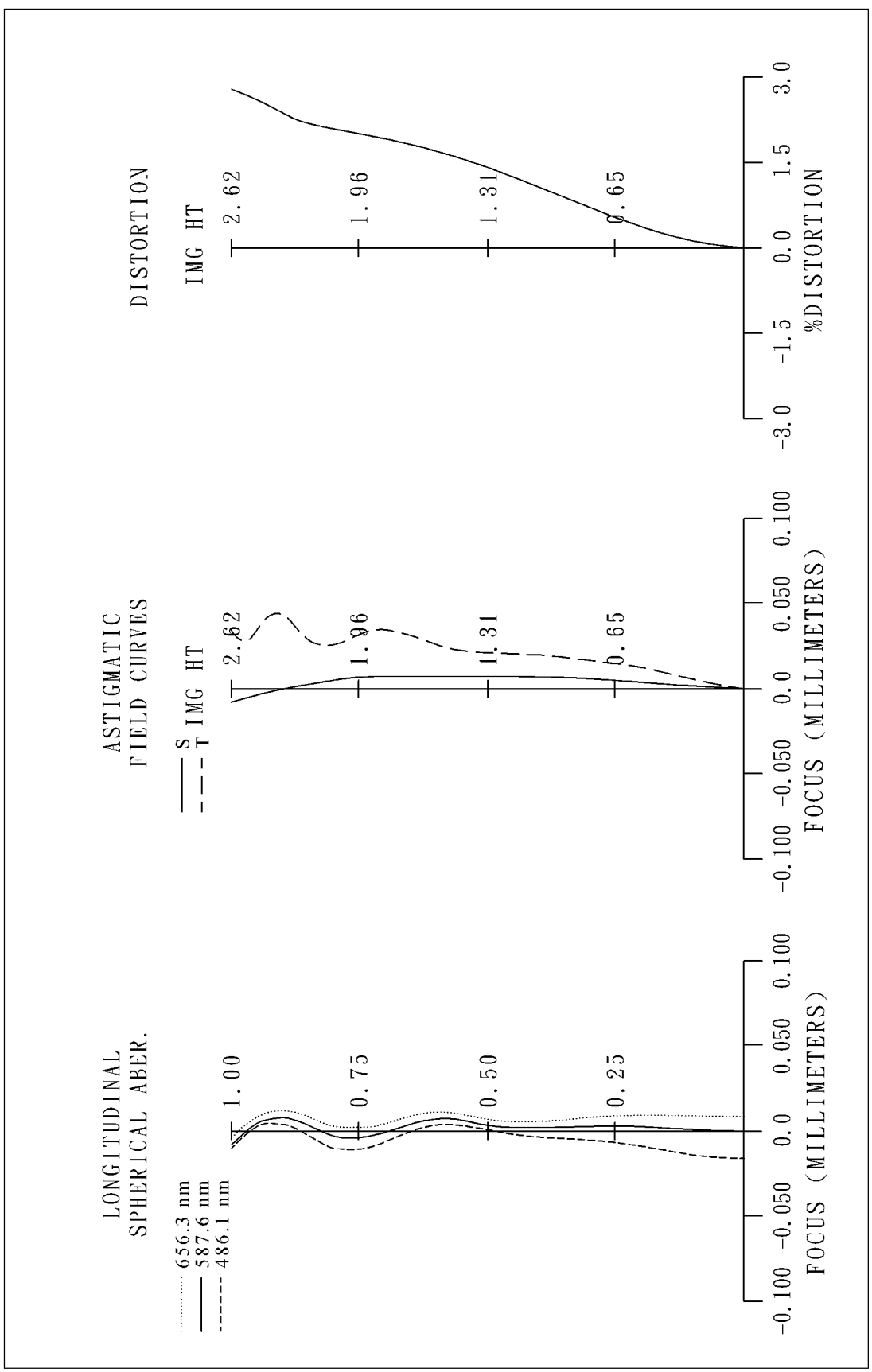
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an optical imaging system (not otherwise herein labeled) of the present disclosure and an image sensor 390. The optical imaging system includes, in order from an object side to an image side, an aperture stop 300, a first lens element 310, a second lens element 320, a third lens element 330, a fourth lens element 340, a fifth lens element 350, and a sixth lens element 360.

The first lens element 310 with positive refractive power has an object-side surface 311 being convex in a paraxial region thereof, an image-side surface 312 being convex in a paraxial region thereof, and both the object-side surface 311 and the image-side surface 312 being aspheric. The first lens element 310 is made of plastic material.

The second lens element 320 with negative refractive power has an object-side surface 321 being concave in a paraxial region thereof, an image-side surface 322 being convex in a paraxial region thereof, both the object-side surface 321 and the image-side surface 322 being aspheric, and at least one inflection point on each of the object-side surface 321 and the image-side surface 322. The second lens element 320 is made of plastic material.

The third lens element 330 with negative refractive power has an object-side surface 331 being convex in a paraxial region thereof, an image-side surface 332 being concave in a paraxial region thereof, and both the object-side surface 331 and the image-side surface 332 being aspheric. The third lens element 330 is made of plastic material.

The fourth lens element 340 with positive refractive power has an object-side surface 341 being convex in a paraxial region thereof, an image-side surface 342 being convex in a paraxial region thereof, both the object-side surface 341 and the image-side surface 342 being aspheric, and at least one inflection point on the object-side surface 341. The fourth lens element 340 is made of plastic material.

The fifth lens element 350 with negative refractive power has an object-side surface 351 being concave in a paraxial region thereof, an image-side surface 352 being concave in a paraxial region thereof, both the object-side surface 351 and the image-side surface 352 being aspheric, and at least one inflection point on the image-side surface 352. The fifth lens element 350 is made of plastic material.

The sixth lens element 360 with positive refractive power has an object-side surface 361 being convex in a paraxial region thereof, an image-side surface 362 being concave in a paraxial region thereof, both the object-side surface 361 and the image-side surface 362 being aspheric, and at least one inflection point on each of the object-side surface 361 and the image-side surface 362. The sixth lens element 360 is made of plastic material.

The optical imaging system further includes an IR cut filter 370 located between the sixth lens element 360 and an image surface 380. The IR cut filter 370 is made of glass material and will not affect the focal length of the optical imaging system. The image sensor 390 is disposed on or near the image surface 380 of the optical imaging system.

The detailed optical data of the 3rd embodiment are shown in TABLE 5, and the aspheric surface data are shown in TABLE 6, wherein the units of the curvature radius, the thickness and the focal length are expressed in mm, and HFOV is a half of the maximal field of view.

TABLE 5

(3rd Embodiment)
f = 5.88 mm, Fno = 1.45, HFOV = 23.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.914 | | | | |
| 2 | Lens 1 | 2.335 | ASP | 1.800 | Plastic | 1.535 | 55.8 | 3.31 |
| 3 | | −5.354 | ASP | 0.152 | | | | |
| 4 | Lens 2 | −4.969 | ASP | 0.215 | Plastic | 1.660 | 20.4 | −8.17 |
| 5 | | −64.883 | ASP | 0.043 | | | | |
| 6 | Lens 3 | 5.220 | ASP | 0.447 | Plastic | 1.535 | 55.8 | −18.06 |
| 7 | | 3.288 | ASP | 0.988 | | | | |
| 8 | Lens 4 | 66.483 | ASP | 0.432 | Plastic | 1.639 | 23.3 | 16.00 |
| 9 | | −12.045 | ASP | 0.052 | | | | |
| 10 | Lens 5 | −3.839 | ASP | 0.385 | Plastic | 1.583 | 30.2 | −3.91 |
| 11 | | 5.834 | ASP | 0.050 | | | | |
| 12 | Lens 6 | 3.705 | ASP | 1.192 | Plastic | 1.639 | 23.3 | 12.57 |
| 13 | | 6.017 | ASP | 0.300 | | | | |
| 14 | IR Cut Filter | Plano | | 0.210 | Glass | 1.517 | 64.2 | — |
| 15 | | Plano | | 0.344 | | | | |
| 16 | Image Surface | Plano | | — | | | | |

Note:
Reference wavelength is d-line 587.6 nm.
The effective radius of Surface 10 is 1.450 mm.

TABLE 6

Aspheric Coefficients

| | Surface # | | | |
|---|---|---|---|---|
| | 2 | 3 | 4 | 5 |
| k = | −1.4452E+00 | 5.6197E+00 | −7.5061E+00 | −9.0000E+01 |
| A4 = | 1.1335E−02 | 8.6447E−02 | 2.4004E−01 | 3.3215E−01 |
| A6 = | −1.4322E−03 | −5.3809E−02 | −2.1133E−01 | −2.3580E−01 |
| A8 = | 9.9625E−04 | 1.9506E−02 | 9.5299E−02 | 2.5034E−02 |
| A10 = | −2.9175E−04 | −3.6800E−03 | −2.0244E−02 | 3.9827E−02 |
| A12 = | 1.6448E−05 | 2.9839E−04 | 1.6744E−03 | −1.0574E−02 |

| | Surface # | | | |
|---|---|---|---|---|
| | 6 | 7 | 9 | 8 |
| k = | −1.9362E+01 | −1.6745E+01 | −2.7680E+01 | 9.0000E+01 |
| A4 = | 1.8410E−01 | 3.2899E−02 | −2.8885E−01 | −1.1171E−01 |
| A6 = | −6.2406E−02 | 1.9470E−02 | 3.1151E−01 | 8.6364E−02 |
| A8 = | −8.2844E−02 | −4.6619E−02 | −3.3464E−01 | −1.7775E−01 |
| A10 = | 7.5382E−02 | 2.8216E−02 | 2.5473E−01 | 1.5137E−01 |
| A12 = | −1.6042E−02 | −6.5063E−03 | −1.1320E−01 | −8.3122E−02 |
| A14 = | | | 2.1226E−02 | 2.0303E−02 |

| | Surface # | | | |
|---|---|---|---|---|
| | 10 | 11 | 12 | 13 |
| k = | −8.6024E+00 | 1.7933E−01 | −3.4171E+01 | 4.9397E+00 |
| A4 = | −1.9301E−01 | −4.6258E−02 | −4.7344E−02 | −4.9004E−02 |
| A6 = | 2.2762E−01 | 1.1896E−02 | −2.2229E−02 | 3.9769E−03 |
| A8 = | −2.2493E−01 | 3.5337E−03 | 5.0593E−02 | 1.1691E−03 |

TABLE 6-continued

| Aspheric Coefficients | | | | |
|---|---|---|---|---|
| A10 = | 1.7446E−01 | −6.4796E−03 | −3.4368E−02 | −8.2575E−04 |
| A12 = | −7.7870E−02 | 2.2069E−03 | 1.1691E−02 | 1.7145E−04 |
| A14 = | 1.3516E−02 | −2.4893E−04 | −1.9836E−03 | −1.1313E−05 |
| A16 = | | | 1.3283E−04 | −1.8092E−07 |

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below

| 3rd Embodiment | | | |
|---|---|---|---|
| f [mm] | 5.88 | BL/CT1 | 0.47 |
| Fno. | 1.45 | tan(HFOV) | 0.43 |
| HFOV [deg.] | 23.4 | TL [mm] | 6.61 |
| (V2 + V4 + V6)/(V1 + V3) | 0.60 | SL/TL | 0.86 |
| (V4 + V5 + V6)/(V1 + V3) | 0.69 | f/TL | 0.89 |
| (CT2 + CT3 + CT4 + CT5)/(CT1 + CT6) | 0.49 | EPD/ImgH | 1.55 |
| ΣAT/T34 | 1.30 | Y11/ImgH | 0.77 |
| (R6 + R7)/(R6 − R7) | −1.10 | Y11/Y62 | 0.87 |
| (R11 − R12)/(R11 + R12) | −0.24 | Yc62/f | 0.18 |
| |f1/f3| | 0.18 | TL/EPD | 1.63 |
| R1/CT1 | 1.30 | f/EPD | 1.45 |

4th Embodiment

Figure 4A:
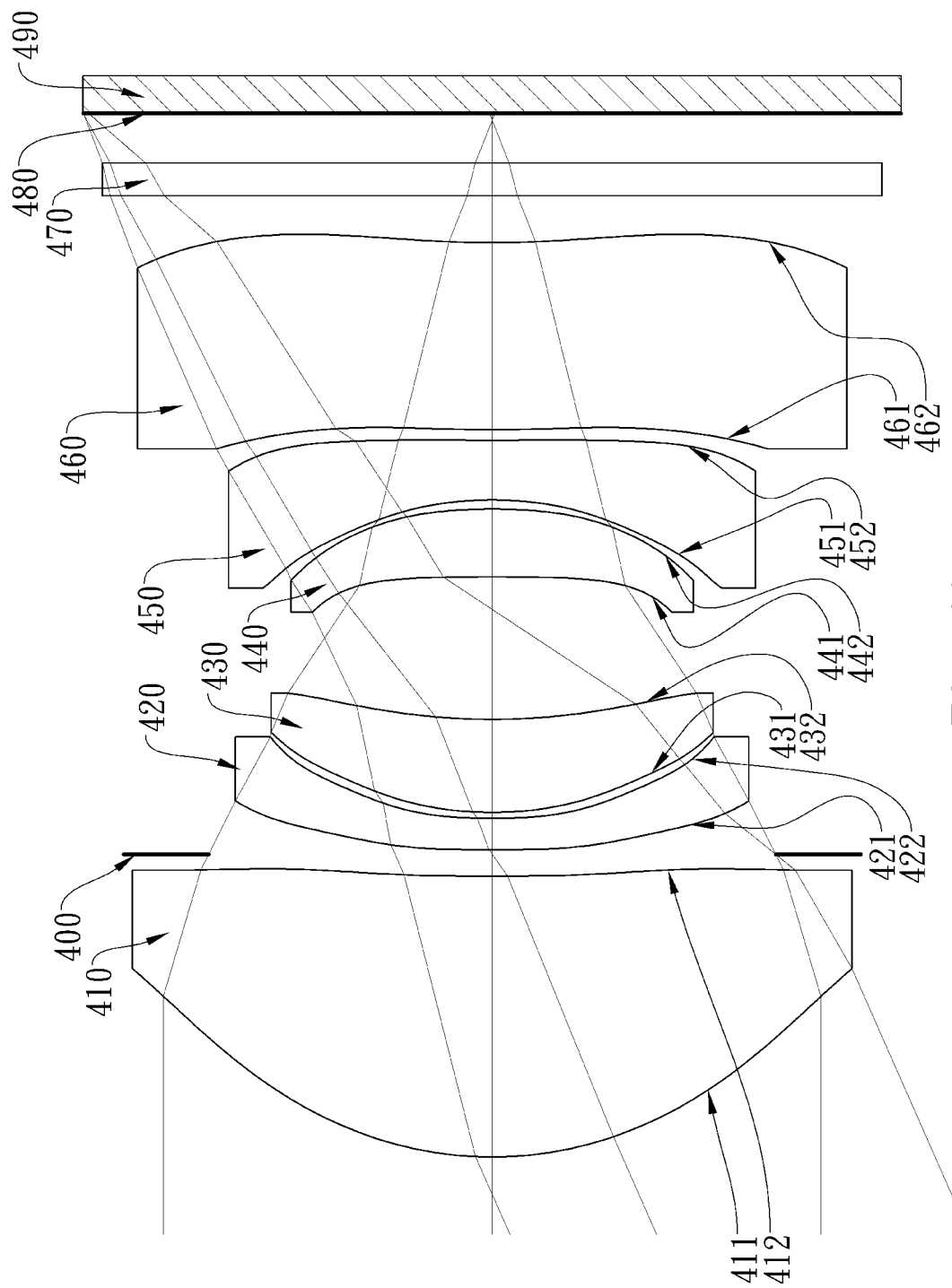
FIG. 4A is a schematic view of an imaging apparatus according to the 4th embodiment of the present disclosure.
Figure 4B:
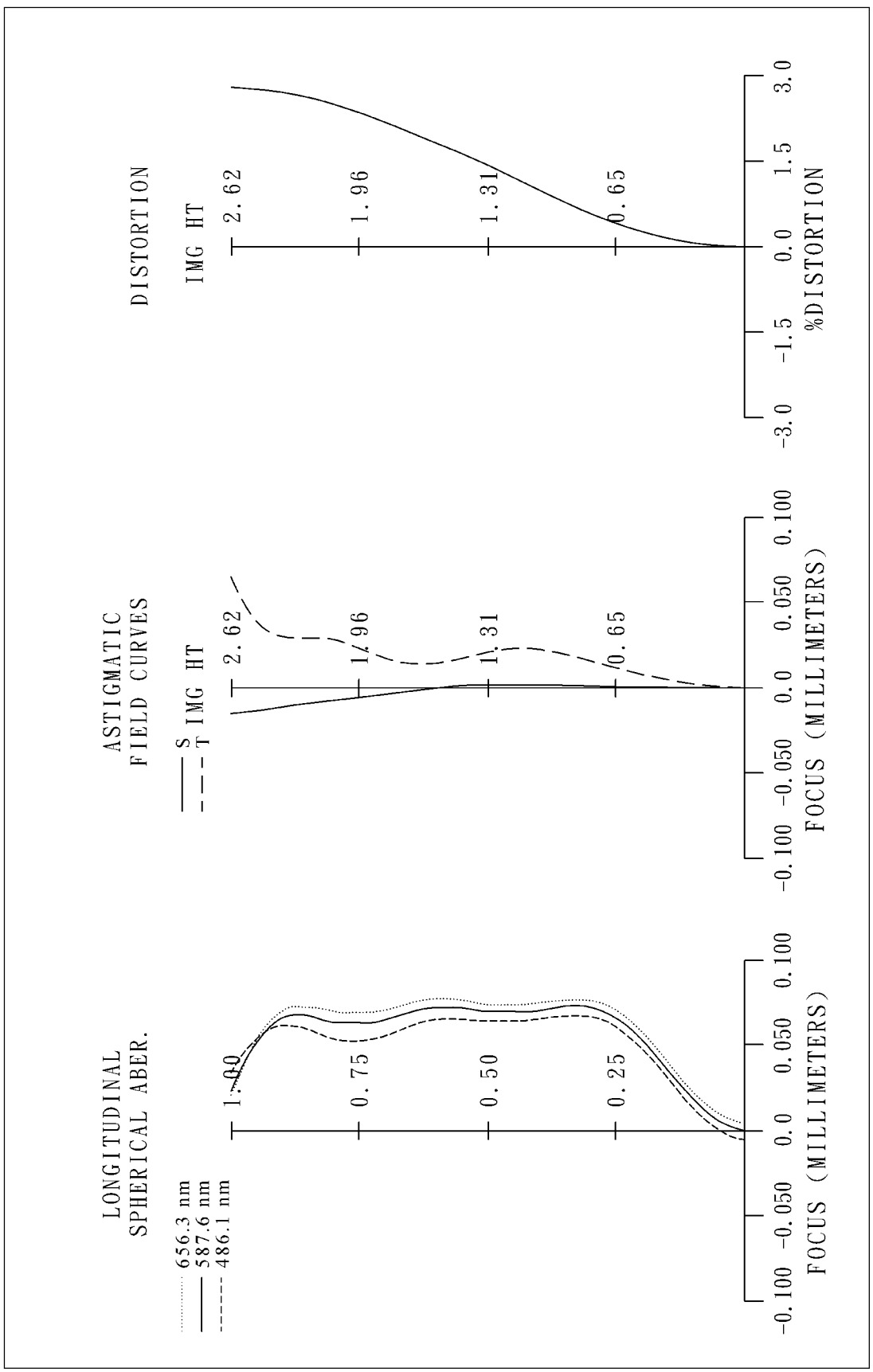
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an optical imaging system (not otherwise herein labeled) of the present disclosure and an image sensor 490. The optical imaging system includes, in order from an object side to an image side, a first lens element 410, an aperture stop 400, a second lens element 420, a third lens element 430, a fourth lens element 440, a fifth lens element 450, and a sixth lens element 460.

The first lens element 410 with positive refractive power has an object-side surface 411 being convex in a paraxial region thereof, an image-side surface 412 being concave in a paraxial region thereof, both the object-side surface 411 and the image-side surface 412 being aspheric, and at least one inflection on the image-side surface 412. The first lens element 410 is made of plastic material.

The second lens element 420 with negative refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, an image-side surface 432 being concave in a paraxial region thereof, both the object-side surface 431 and the image-side surface 432 being aspheric, and at least one inflection point on the image-side surface 432. The third lens element 430 is made of plastic material.

The fourth lens element 440 with positive refractive power has an object-side surface 441 being concave in a paraxial region thereof, an image-side surface 442 being convex in a paraxial region thereof, and both the object-side surface 441 and the image-side surface 442 being aspheric. The fourth lens element 440 is made of plastic material.

The fifth lens element 450 with negative refractive power has an object-side surface 451 being concave in a paraxial region thereof, an image-side surface 452 being concave in a paraxial region thereof, both the object-side surface 451 and the image-side surface 452 being aspheric, ant at least one inflection point on the image-side surface 452. The fifth lens element 450 is made of plastic material.

The sixth lens element 460 with negative refractive power has an object-side surface 461 being convex in a paraxial region thereof, an image-side surface 462 being concave in a paraxial region thereof, both the object-side surface 461 and the image-side surface 462 being aspheric, and at least one inflection point on each of the object-side surface 461 and the image-side surface 462. The sixth lens element 460 is made of plastic material.

The optical imaging system further includes an IR cut filter 470 located between the sixth lens element 460 and an image surface 480. The IR cut filter 470 is made of glass material and will not affect the focal length of the optical imaging system. The image sensor 490 is disposed on or near the image surface 480 of the optical imaging system.

The detailed optical data of the 4th embodiment are shown in TABLE 7, and the aspheric surface data are shown in TABLE 8, wherein the units of the curvature radius, the thickness and the focal length are expressed in mm, and HFOV is a half of the maximal field of view.

TABLE 7

(4th Embodiment)
f = 5.68 mm, Fno = 1.35, HFOV = 23.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.351 | ASP | 1.800 | Plastic | 1.535 | 55.8 | 4.62 |
| 2 | | 35.282 | ASP | 0.140 | | | | |
| 3 | Ape. Stop | Plano | | 0.030 | | | | |

TABLE 7-continued (4th Embodiment)
f = 5.68 mm, Fno = 1.35, HFOV = 23.8 deg.

| Surface # | | Curvature Radius | | Thickness | Material | Index | Abbe # | Focal Length |
|---|---|---|---|---|---|---|---|---|
| 4 | Lens 2 | 46.729 | ASP | 0.201 | Plastic | 1.671 | 19.5 | −7.05 |
| 5 | | 4.288 | ASP | 0.038 | | | | |
| 6 | Lens 3 | 2.300 | ASP | 0.596 | Plastic | 1.535 | 55.8 | 9.36 |
| 7 | | 3.870 | ASP | 0.913 | | | | |
| 8 | Lens 4 | −56.464 | ASP | 0.435 | Plastic | 1.639 | 23.3 | 7.24 |
| 9 | | −4.286 | ASP | 0.059 | | | | |
| 10 | Lens 5 | −2.493 | ASP | 0.382 | Plastic | 1.583 | 30.2 | −4.08 |
| 11 | | 56.685 | ASP | 0.068 | | | | |
| 12 | Lens 6 | 8.312 | ASP | 1.200 | Plastic | 1.671 | 19.5 | −51.08 |
| 13 | | 6.302 | ASP | 0.300 | | | | |
| 14 | IR Cut Filter | Plano | | 0.210 | Glass | 1.517 | 64.2 | — |
| 15 | | Plano | | 0.319 | | | | |
| 16 | Image Surface | Plano | | — | | | | |

Note:
Reference wavelength is d-line 587.6 nm.
The effective radius of Surface 10 is 1.470 mm.

TABLE 8

Aspheric Coefficients

| | Surface # | | | |
|---|---|---|---|---|
| | 1 | 2 | 4 | 5 |
| k = | −1.5666E+00 | −9.0000E+01 | 4.9328E+01 | −3.8840E+01 |
| A4 = | 1.1781E−02 | 5.7135E−02 | 2.2805E−01 | 3.2012E−01 |
| A6 = | −7.0440E−04 | −5.4412E−02 | −2.1981E−01 | −2.3656E−01 |
| A8 = | 6.1980E−04 | 2.0254E−02 | 9.6342E−02 | 2.3409E−02 |
| A10 = | −2.0817E−04 | −3.5311E−03 | −1.8724E−02 | 3.9435E−02 |
| A12 = | 1.6088E−05 | 2.4013E−04 | 1.3247E−03 | −1.0196E−02 |

| | Surface # | | | |
|---|---|---|---|---|
| | 6 | 7 | 8 | 9 |
| k = | −1.5353E+01 | −2.4132E+01 | −9.0000E+01 | −4.2868E+01 |
| A4 = | 1.8326E−01 | 1.8248E−02 | −9.8262E−02 | −2.8210E−01 |
| A6 = | −6.3462E−02 | 2.0668E−02 | 8.0799E−02 | 3.1120E−01 |
| A8 = | −8.3611E−02 | −4.4918E−02 | −1.7495E−01 | −3.3162E−01 |
| A10 = | 7.3259E−02 | 2.7460E−02 | 1.5258E−01 | 2.5187E−01 |
| A12 = | −1.5091E−02 | −6.3058E−03 | −8.3638E−02 | −1.1358E−01 |
| A14 = | | | 1.9593E−02 | 2.1274E−02 |

| | Surface # | | | |
|---|---|---|---|---|
| | 10 | 11 | 12 | 13 |
| k = | −2.5547E+00 | 9.0000E+01 | −9.0000E+01 | 5.0209E+00 |
| A4 = | −1.6210E−01 | −2.2748E−02 | −4.5448E−02 | −3.5277E−02 |
| A6 = | 2.2536E−01 | 3.7134E−03 | −2.0795E−02 | −1.0048E−03 |
| A8 = | −2.2682E−01 | 4.3273E−03 | 4.9507E−02 | 3.3662E−03 |
| A10 = | 1.7312E−01 | −6.3985E−03 | −3.4248E−02 | −1.3496E−03 |
| A12 = | −7.7817E−02 | 2.1526E−03 | 1.1691E−02 | 2.4948E−04 |
| A14 = | 1.3705E−02 | −2.3597E−04 | −1.9831E−03 | −2.1771E−05 |
| A16 = | | | 1.3288E−04 | 6.3308E−07 |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in the table below.

| 4th Embodiment | | | |
|---|---|---|---|
| f [mm] | 5.68 | BL/CT1 | 0.46 |
| Fno. | 1.35 | tan(HFOV) | 0.44 |
| HFOV [deg.] | 23.8 | TL [mm] | 6.69 |
| (V2 + V4 + V6)/(V1 + V3) | 0.56 | SL/TL | 0.71 |
| (V4 + V5 + V6)/(V1 + V3) | 0.65 | f/TL | 0.85 |
| (CT2 + CT3 + CT4 + CT5)/(CT1 + CT6) | 0.54 | EPD/ImgH | 1.61 |
| ΣAT/T34 | 1.37 | Y11/ImgH | 0.88 |
| (R6 + R7)/(R6 − R7) | −0.87 | Y11/Y62 | 1.07 |

-continued

| 4th Embodiment | | | |
|---|---|---|---|
| (R11 − R12)/(R11 + R12) | 0.14 | Yc62/f | 0.21 |
| |f1/f3| | 0.49 | TL/EPD | 1.59 |
| R1/CT1 | 1.31 | f/EPD | 1.35 |

5th Embodiment

Figure 5A:
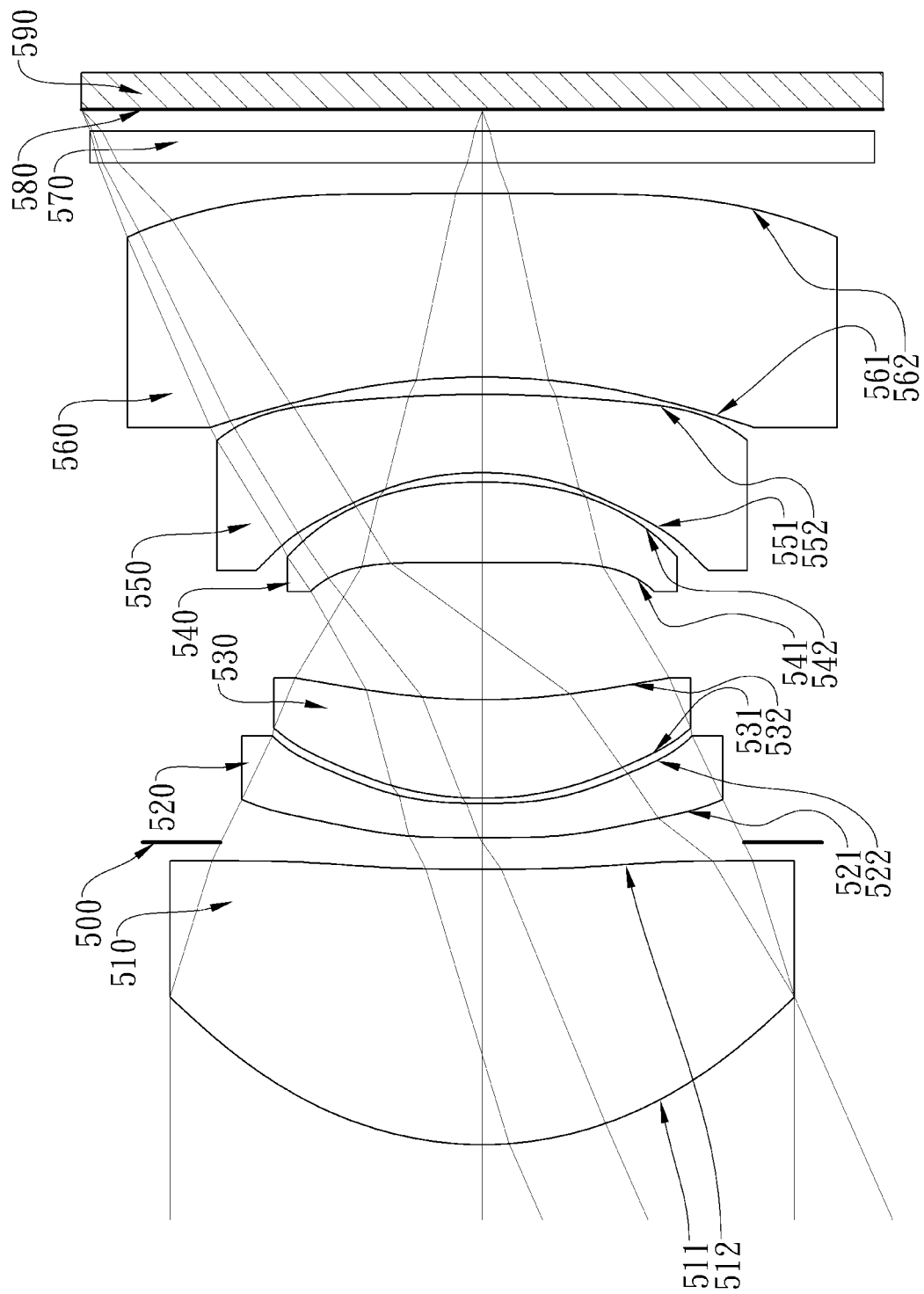
FIG. 5A is a schematic view of an imaging apparatus according to the 5th embodiment of the present disclosure.
Figure 5B:
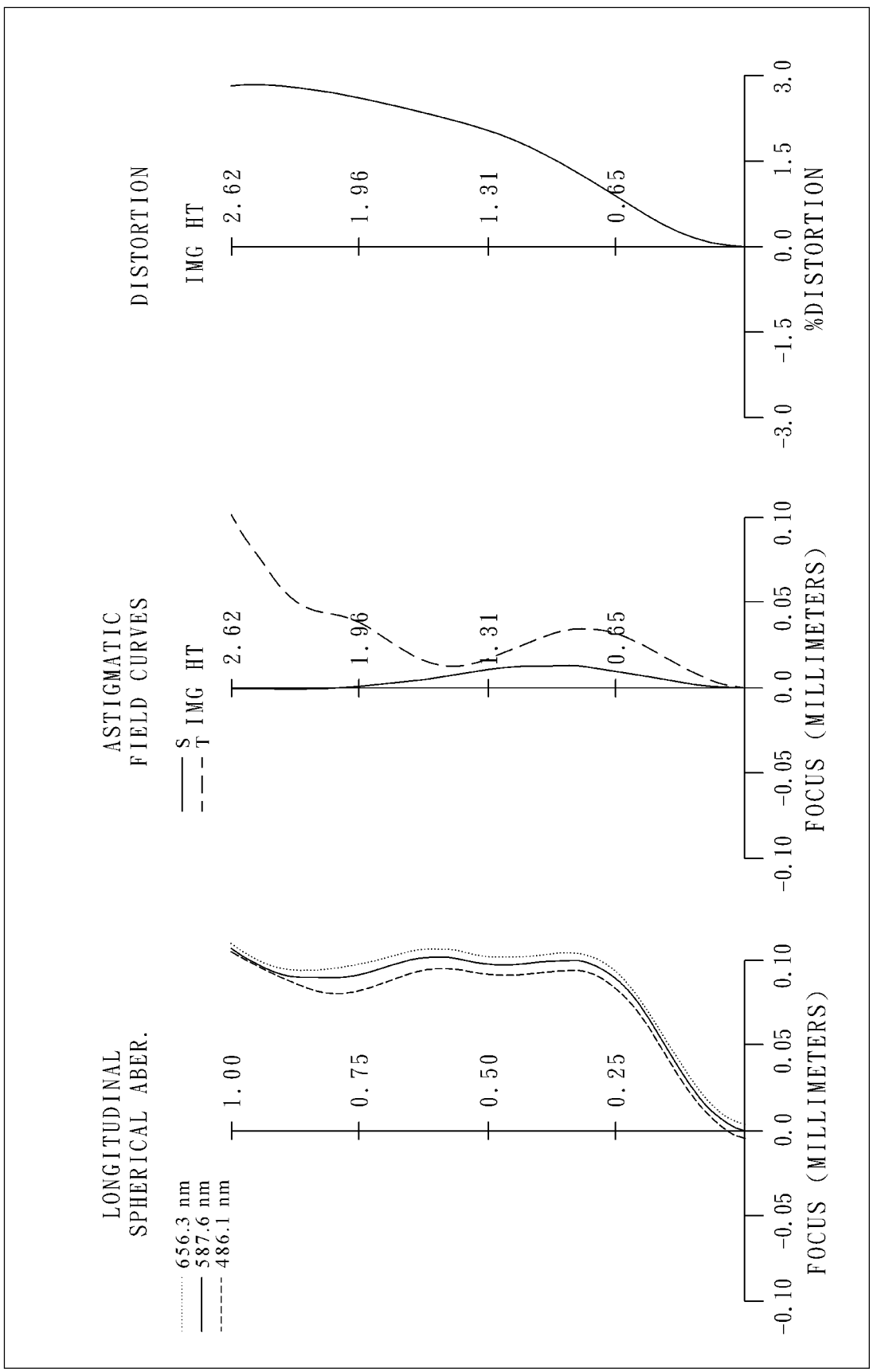
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an optical imaging system (not otherwise herein labeled) of the present disclosure and an image sensor 590. The optical imaging system includes, in order from an object side to an image side, a first lens element 510, an aperture stop 500, a second lens element 520, a third lens element 530, a fourth lens element 540, a fifth lens element 550, and a sixth lens element 560.

The first lens element 510 with positive refractive power has an object-side surface 511 being convex in a paraxial region thereof, an image-side surface 512 being concave in a paraxial region thereof, and both the object-side surface 511 and the image-side surface 512 being aspheric. The first lens element 510 is made of plastic material.

The second lens element 520 with negative refractive power has an object-side surface 521 being convex in a paraxial region thereof, an image-side surface 522 being concave in a paraxial region thereof, and both the object-side surface 521 and the image-side surface 522 being aspheric. The second lens element 520 is made of plastic material.

The third lens element 530 with positive refractive power has an object-side surface 531 being convex in a paraxial region thereof, an image-side surface 532 being concave in a paraxial region thereof, and both the object-side surface 531 and the image-side surface 532 being aspheric. The third lens element 530 is made of plastic material.

The fourth lens element 540 with positive refractive power has an object-side surface 541 being convex in a paraxial region thereof, an image-side surface 542 being convex in a paraxial region thereof, both the object-side surface 541 and the image-side surface 542 being aspheric, and at least one inflection point on the object-side surface 541. The fourth lens element 540 is made of plastic material.

The fifth lens element 550 with negative refractive power has an object-side surface 551 being concave in a paraxial region thereof, an image-side surface 552 being convex in a paraxial region thereof, and both the object-side surface 551 and the image-side surface 552 being aspheric The fifth lens element 550 is made of plastic material.

The sixth lens element 560 with negative refractive power has an object-side surface 561 being concave in a paraxial region thereof, an image-side surface 562 being convex in a paraxial region thereof, both the object-side surface 561 and the image-side surface 562 being aspheric, and at least one inflection point on the image-side surface 562. The sixth lens element 560 is made of plastic material.

The optical imaging system further includes an IR cut filter 570 located between the sixth lens element 560 and an image surface 580. The IR cut filter 570 is made of glass material and will not affect the focal length of the optical imaging system. The image sensor 590 is disposed on or near the image surface 580 of the optical imaging system.

The detailed optical data of the 5th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(5th Embodiment)
f = 5.65 mm, Fno = 1.35, HFOV = 23.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.377 | ASP | 1.800 | Plastic | 1.535 | 55.8 | 4.73 |
| 2 | | 28.626 | ASP | 0.177 | | | | |
| 3 | Ape. Stop | Plano | | 0.030 | | | | |
| 4 | Lens 2 | 41.858 | ASP | 0.224 | Plastic | 1.671 | 19.5 | −7.09 |
| 5 | | 4.264 | ASP | 0.035 | | | | |
| 6 | Lens 3 | 2.237 | ASP | 0.644 | Plastic | 1.535 | 55.8 | 8.65 |
| 7 | | 3.896 | ASP | 0.898 | | | | |
| 8 | Lens 4 | 36.304 | ASP | 0.526 | Plastic | 1.639 | 23.3 | 4.36 |
| 9 | | −3.001 | ASP | 0.062 | | | | |
| 10 | Lens 5 | −2.049 | ASP | 0.511 | Plastic | 1.583 | 30.2 | −4.86 |
| 11 | | −8.068 | ASP | 0.114 | | | | |
| 12 | Lens 6 | −4.222 | ASP | 1.200 | Plastic | 1.671 | 19.5 | −6.99 |
| 13 | | −47.393 | ASP | 0.200 | | | | |
| 14 | IR Cut Filter | Plano | | 0.210 | Glass | 1.517 | 64.2 | — |
| 15 | | Plano | | 0.141 | | | | |
| 16 | Image Surface | Plano | | — | | | | |

Note:
Reference wavelength is d-line 587.6 nm.
The effective radius of Surface 1 is 2.040 mm.
The effective radius of Surface 10 is 1.480 mm.

TABLE 10

Aspheric Coefficients

| Surface # | 1 | 2 | 4 | 5 |
|---|---|---|---|---|
| k = | −1.5850E+00 | −7.3740E+01 | 8.3184E+01 | −4.2379E+01 |
| A4 = | 1.1716E−02 | 5.6895E−02 | 2.2810E−01 | 3.1929E−01 |
| A6 = | −7.1348E−04 | −5.3784E−02 | −2.2103E−01 | −2.3767E−01 |
| A8 = | 5.91164E−04 | 2.0030E−02 | 9.5793E−02 | 2.2638E−02 |
| A10 = | −2.0114E−04 | −3.5383E−03 | −1.8658E−02 | 3.9283E−02 |
| A12 = | 1.7417E−05 | 2.5297E−04 | 1.3678E−03 | −1.0098E−02 |

| Surface # | 6 | 7 | 8 | 9 |
|---|---|---|---|---|
| k = | −1.6674E+01 | −2.9760E+01 | 9.0000E+01 | −3.4846E+01 |
| A4 = | 1.8067E−01 | 1.1653E−02 | −9.5138E−02 | −2.8633E−01 |
| A6 = | −6.3121E−02 | 2.0970E−02 | 6.9922E−02 | 3.0931E−01 |
| A8 = | −8.3196E−02 | −4.4024E−02 | −1.7684E−01 | −3.3203E−01 |
| A10 = | 7.3251E−02 | 2.7872E−02 | 1.5184E−01 | 2.5185E−01 |
| A12 = | −1.5041E−02 | −6.4336E−03 | −8.3536E−02 | −1.1356E−01 |
| A14 = | | | 2.0125E−02 | 2.1278E−02 |

| Surface # | 10 | 11 | 12 | 13 |
|---|---|---|---|---|
| k = | −2.6705E+00 | −9.0000E+01 | −5.1597E+01 | −9.0000E+01 |
| A4 = | −1.5988E−01 | −4.9285E−03 | −3.6395E−02 | 2.3917E−02 |
| A6 = | 2.2633E−01 | 4.5999E−04 | −2.0507E−02 | −3.4310E−02 |
| A8 = | −2.2692E−01 | 4.2778E−03 | 4.9511E−02 | 1.7811E−02 |
| A10 = | 1.7295E−01 | −6.3621E−03 | −3.4252E−02 | −5.5074E−03 |
| A12 = | −7.7909E−02 | 2.1422E−03 | 1.1690E−02 | 1.0110E−03 |
| A14 = | 1.3664E−02 | −2.3631E−04 | −1.9838E−03 | −9.9728E−05 |
| A16 = | | | 1.3266E−04 | 4.0119E−06 |

In the 5th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in the table below.

| 5th Embodiment | | | |
|---|---|---|---|
| f [mm] | 5.65 | BL/CT1 | 0.31 |
| Fno. | 1.35 | tan(HFOV) | 0.44 |
| HFOV [deg.] | 23.8 | TL [mm] | 6.77 |
| (V2 + V4 + V6)/(V1 + V3) | 0.56 | SL/TL | 0.71 |
| (V4 + V5 + V6)/(V1 + V3) | 0.65 | f/TL | 0.83 |
| (CT2 + CT3 + CT4 + CT5)/(CT1 + CT6) | 0.64 | EPD/ImgH | 1.60 |
| ΣAT/T34 | 1.47 | Y11/ImgH | 0.78 |
| (R6 + R7)/(R6 − R7) | −1.24 | Y11/Y62 | 0.91 |
| (R11 − R12)/(R11 + R12) | −0.84 | Yc62/f | — |
| |f1/f3| | 0.55 | TL/EPD | 1.62 |
| R1/CT1 | 1.32 | f/EPD | 1.35 |

6th Embodiment

Figure 6A:
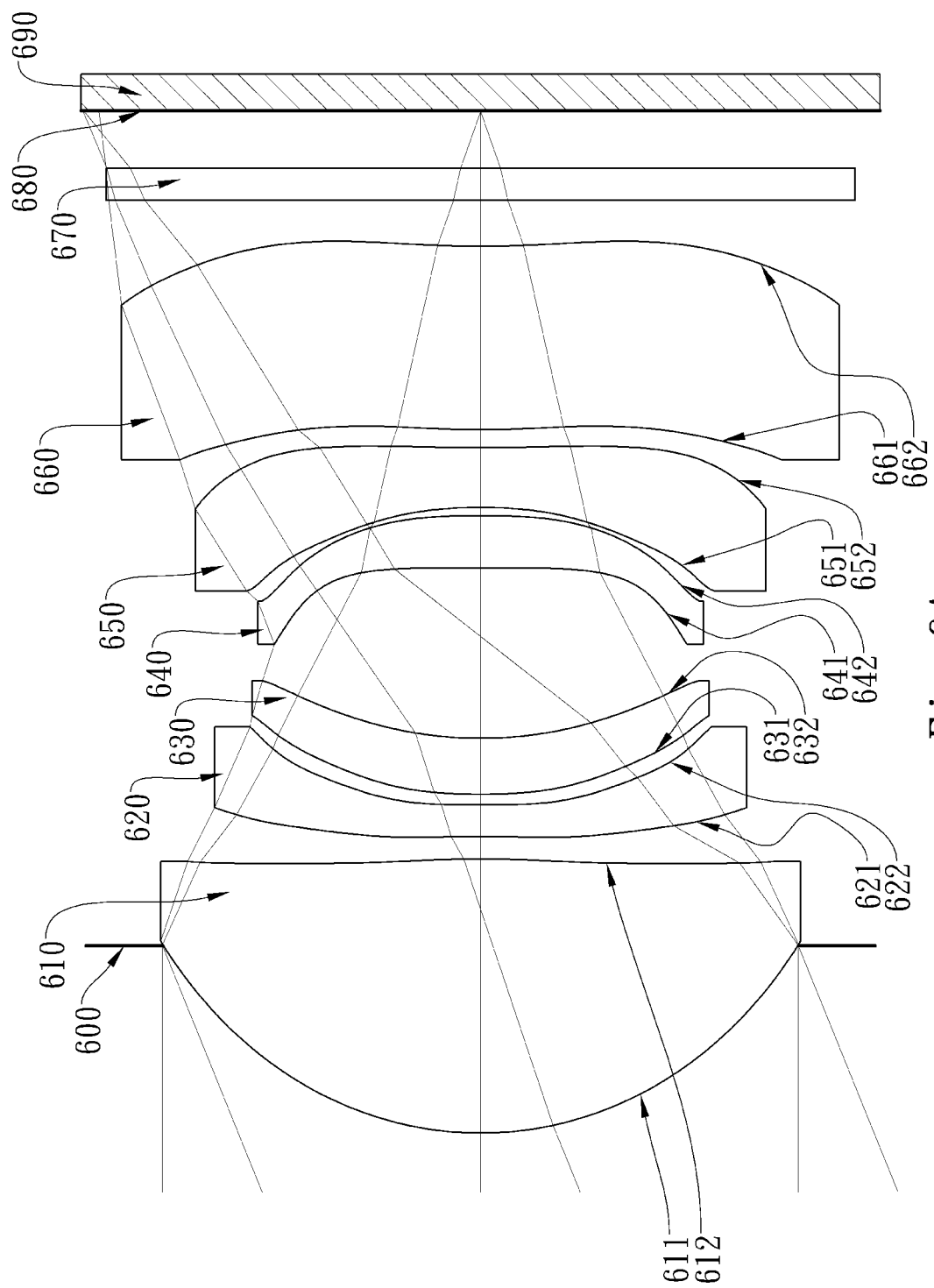
FIG. 6A is a schematic view of an imaging apparatus according to the 6th embodiment of the present disclosure.
Figure 6B:
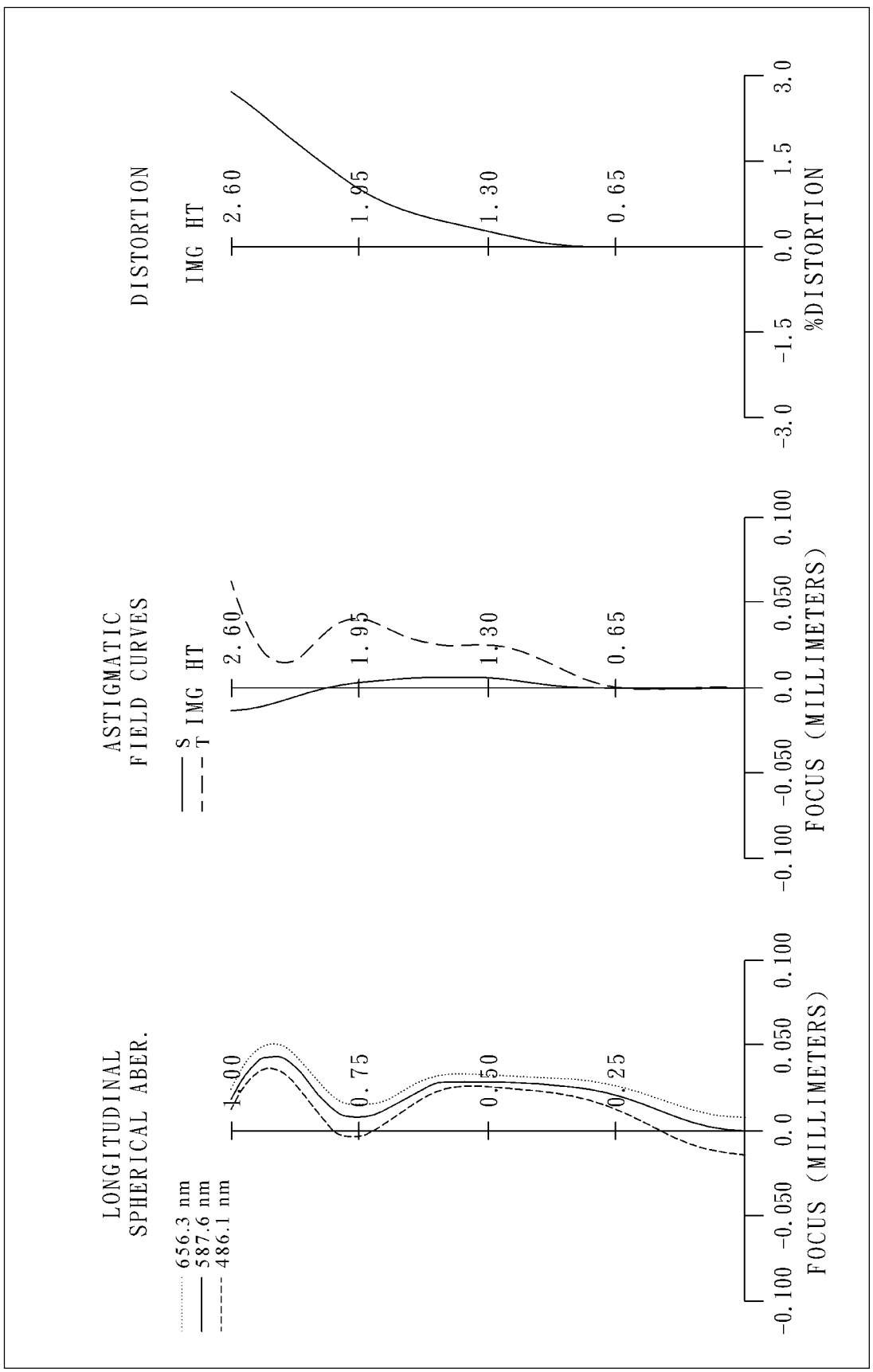
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an optical imaging system (not otherwise herein labeled) of the present disclosure and an image sensor 690. The optical imaging system includes, in order from an object side to an image side, an aperture stop 600, a first lens element 610, a second lens element 620, a third lens element 630, a fourth lens element 640, a fifth lens element 650, and a sixth lens element 660.

The first lens element 610 with positive refractive power has an object-side surface 611 being convex in a paraxial region thereof, an image-side surface 612 being convex in a paraxial region thereof, both the object-side surface 611 and the image-side surface 612 being aspheric, and at least one inflection point on the image-side surface 612. The first lens element 610 is made of plastic material.

The second lens element 620 with negative refractive power has an object-side surface 621 being concave in a paraxial region thereof, an image-side surface 622 being concave in a paraxial region thereof, both the object-side surface 621 and the image-side surface 622 being aspheric, and at least one inflection point on the object-side surface 621. The second lens element 620 is made of plastic material.

The third lens element 630 with negative refractive power has an object-side surface 631 being convex in a paraxial region thereof, an image-side surface 632 being concave in a paraxial region thereof, and both the object-side surface 631 and the image-side surface 632 being aspheric. The third lens element 630 is made of plastic material.

The fourth lens element 640 with positive refractive power has an object-side surface 641 being convex in a paraxial region thereof, an image-side surface 642 being convex in a paraxial region thereof, both the object-side surface 641 and the image-side surface 642 being aspheric, and at least one inflection point on the object-side surface 641. The fourth lens element 640 is made of plastic material.

The fifth lens element 650 with negative refractive power has an object-side surface 651 being concave in a paraxial region thereof, an image-side surface 652 being concave in a paraxial region thereof, both the object-side surface 651 and the image-side surface 652 being aspheric, and at least one inflection point on each of the object-side surface 651 and the image-side surface 652. The fifth lens element 650 is made of plastic material.

The sixth lens element 660 with positive refractive power has an object-side surface 661 being convex in a paraxial region thereof, an image-side surface 662 being concave in a paraxial region thereof, both the object-side surface 661 and the image-side surface 662 being aspheric, and at least one inflection point on each of the object-side surface 661 and the image-side surface 662. The sixth lens element 660 is made of plastic material.

The optical imaging system further includes an IR cut filter 670 located between the sixth lens element 660 and an image surface 680. The IR cut filter 670 is made of glass material and will not affect the focal length of the optical imaging system. The image sensor 690 is disposed on or near the image surface 680 of the optical imaging system.

The detailed optical data of the 6th embodiment are shown in TABLE 15, and the aspheric surface data are shown in TABLE 16, wherein the units of the curvature radius, the thickness and the focal length are expressed in mm, and HFOV is a half of the maximal field of view.

TABLE 11

(6th Embodiment)
f = 6.23 mm, Fno = 1.50, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.224 | | | | |
| 2 | Lens 1 | 2.229 | ASP | 1.793 | Plastic | 1.535 | 55.8 | 3.33 |
| 3 | | −6.400 | ASP | 0.147 | | | | |
| 4 | Lens 2 | −6.988 | ASP | 0.207 | Plastic | 1.671 | 19.5 | −7.65 |
| 5 | | 19.518 | ASP | 0.069 | | | | |
| 6 | Lens 3 | 4.040 | ASP | 0.367 | Plastic | 1.535 | 55.8 | −15.26 |
| 7 | | 2.617 | ASP | 1.114 | | | | |
| 8 | Lens 4 | 69.131 | ASP | 0.342 | Plastic | 1.639 | 23.3 | 10.71 |
| 9 | | −7.579 | ASP | 0.054 | | | | |
| 10 | Lens 5 | −3.227 | ASP | 0.390 | Plastic | 1.583 | 30.2 | −4.29 |
| 11 | | 11.687 | ASP | 0.118 | | | | |
| 12 | Lens 6 | 5.446 | ASP | 1.200 | Plastic | 1.671 | 19.5 | 43.69 |
| 13 | | 6.097 | ASP | 0.300 | | | | |
| 14 | IR Cut Filter | Plano | | 0.210 | Glass | 1.517 | 64.2 | — |
| 15 | | Plano | | 0.377 | | | | |
| 16 | Image Surface | Plano | | — | | | | |

Note:
Reference wavelength is d-line 587.6 nm.

TABLE 12

Aspheric Coefficients

| Surface # | | | | |
|---|---|---|---|---|
| | 2 | 3 | 4 | 5 |
| k = | −1.3053E+00 | 7.9134E+00 | −1.4106E+01 | −8.9083E+01 |
| A4 = | 1.2770E−02 | 9.1050E−02 | 2.4043E−01 | 3.2920E−01 |
| A6 = | −5.7648E−04 | −5.3880E−02 | −2.1405E−01 | −2.3717E−01 |
| A8 = | 9.4460E−04 | 1.9526E−02 | 9.4325E−02 | 2.3963E−02 |
| A10 = | −2.2821E−04 | −3.6552E−03 | −1.9901E−02 | 3.9284E−02 |
| A12 = | 2.2541E−05 | 2.8968E−04 | 1.6205E−03 | −1.0735E−02 |

| Surface # | | | | |
|---|---|---|---|---|
| | 6 | 7 | 8 | 9 |
| k = | −1.0436E+01 | −5.5542E+00 | −6.5419E+01 | −4.9065E+01 |
| A4 = | 1.8516E−01 | 3.1173E−02 | −1.1240E−01 | −2.7593E−01 |
| A6 = | −6.2838E−02 | 1.9963E−02 | 9.5560E−02 | 3.0789E−01 |
| A8 = | −8.4047E−02 | −4.4309E−02 | −1.8283E−01 | −3.3762E−01 |
| A10 = | 7.4392E−02 | 2.8210E−02 | 1.4970E−01 | 2.5483E−01 |
| A12 = | −1.5875E−02 | −6.3710E−03 | −8.1020E−02 | −1.1347E−01 |
| A14 = | | | 1.8809E−02 | 2.1091E−02 |

TABLE 12-continued

Aspheric Coefficients

| Surface # | | | | |
|---|---|---|---|---|
| | 10 | 11 | 12 | 13 |
| k = | −1.0831E+01 | −2.1517E+01 | −8.2720E+01 | 4.9021E+00 |
| A4 = | −1.9605E−01 | −4.7704E−02 | −4.2763E−02 | −6.5073E−02 |
| A6 = | 2.2870E−01 | 1.0398E−02 | −3.8864E−02 | 1.5401E−02 |
| A8 = | −2.2427E−01 | 3.4695E−03 | 6.5118E−02 | −4.5988E−03 |
| A10 = | 1.7435E−01 | −6.4990E−03 | −4.0835E−02 | 1.2162E−03 |
| A12 = | −7.7658E−02 | 2.2119E−03 | 1.3226E−02 | −2.3055E−04 |
| A14 = | 1.3268E−02 | −2.4512E−04 | −2.1648E−03 | 2.6594E−05 |
| A16 = | | | 1.4088E−04 | −1.4608E−06 |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in the table below.

| 6th Embodiment | | | |
|---|---|---|---|
| f [mm] | 6.23 | BL/CT1 | 0.49 |
| Fno. | 1.50 | tan(HFOV) | 0.40 |
| HFOV [deg.] | 22.0 | TL [mm] | 6.69 |
| (V2 + V4 + V6)/(V1 + V3) | 0.56 | SL/TL | 0.82 |
| (V4 + V5 + V6)/(V1 + V3) | 0.65 | f/TL | 0.93 |
| (CT2 + CT3 + CT4 + CT5)/(CT1 + CT6) | 0.44 | EPD/ImgH | 1.60 |
| ΣAT/T34 | 1.35 | Y11/ImgH | 0.80 |
| (R6 + R7)/(R6 − R7) | −1.08 | Y11/Y62 | 0.89 |
| (R11 − R12)/(R11 + R12) | −0.06 | Yc62/f | 0.15 |
| |f1/f3| | 0.22 | TL/EPD | 1.61 |
| R1/CT1 | 1.24 | f/EPD | 1.50 |

7th Embodiment

Figure 7A:
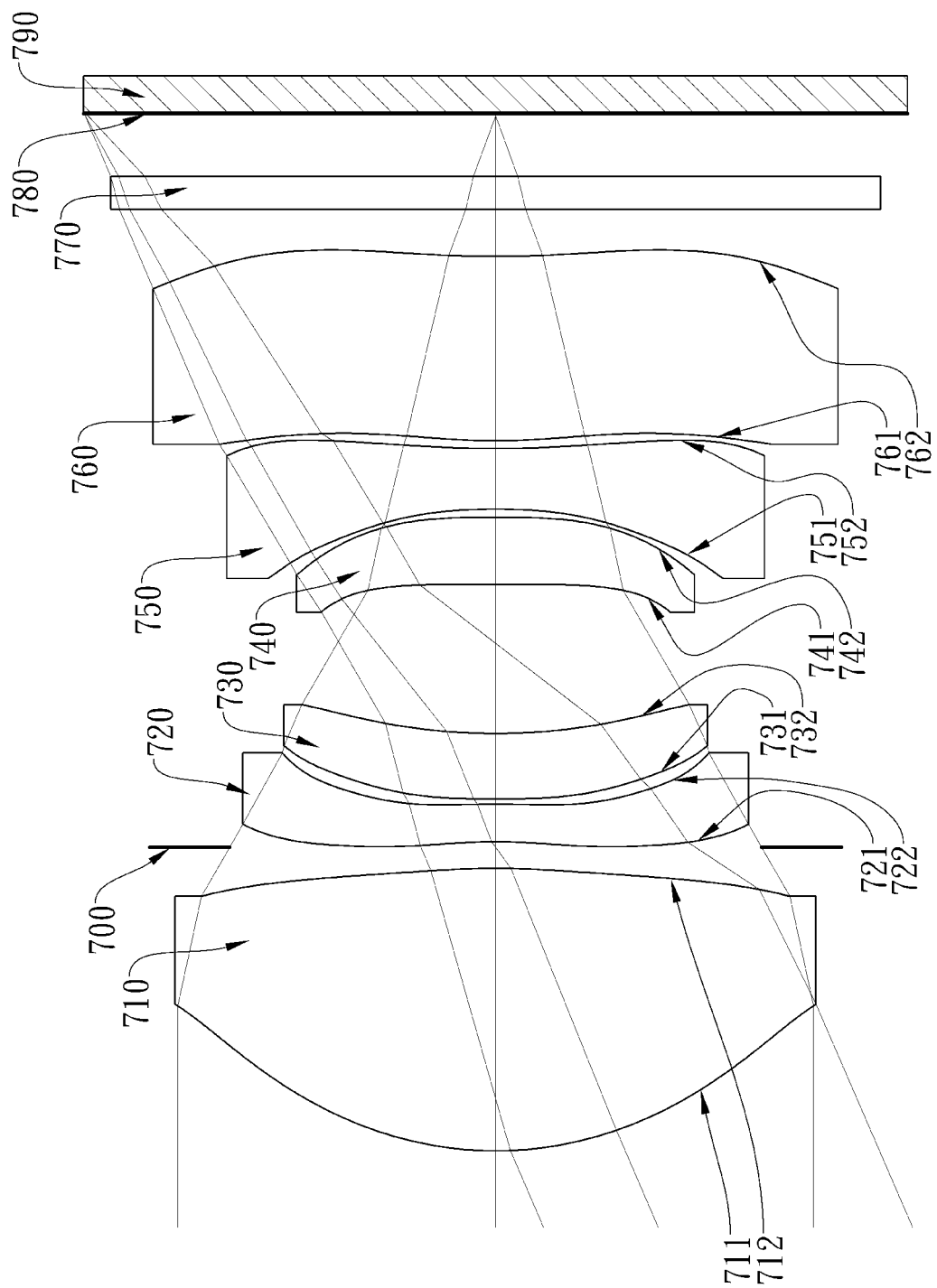
FIG. 7A is a schematic view of an imaging apparatus according to the 7th embodiment of the present disclosure.
Figure 7B:
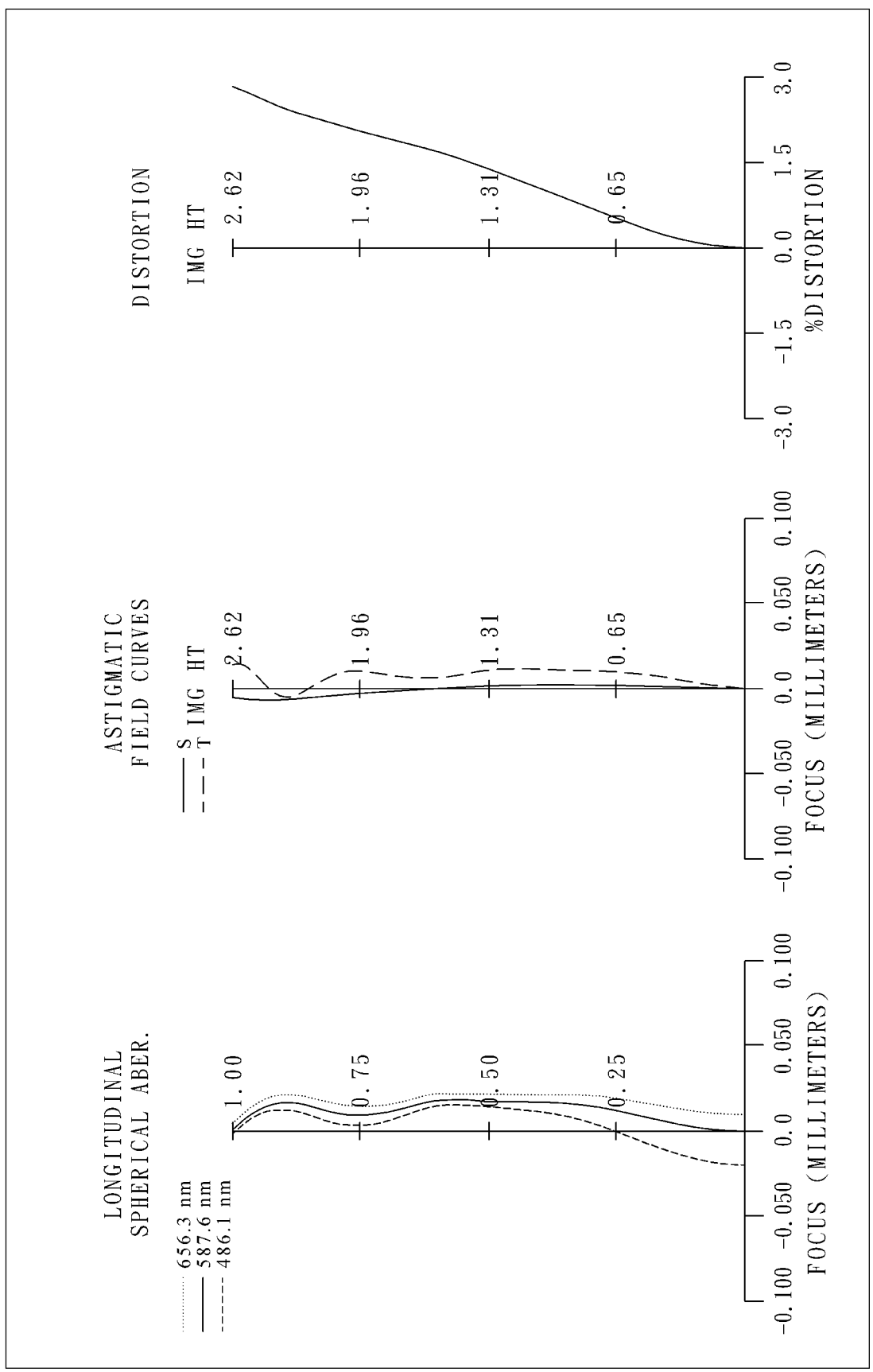
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an optical imaging system (not otherwise herein labeled) of the present disclosure and an image sensor 790. The optical imaging system includes, in order from an object side to an image side, a first lens element 710, an aperture stop 700, a second lens element 720, a third lens element 730, a fourth lens element 740, a fifth lens element 750, and a sixth lens element 760.

The first lens element 710 with positive refractive power has an object-side surface 711 being convex in a paraxial region thereof, an image-side surface 712 being convex in a paraxial region thereof, both the object-side surface 711 and the image-side surface 712 being aspheric, and at least one inflection point on the object-side surface 711. The first lens element 710 is made of plastic material.

The second lens element 720 with negative refractive power has an object-side surface 721 being concave in a paraxial region thereof, an image-side surface 722 being convex in a paraxial region thereof, both the object-side surface 721 and the image-side surface 722 being aspheric, and at least one inflection point on each of the object-side surface 721 and the image-side surface 722. The second lens element 720 is made of plastic material.

The third lens element 730 with negative refractive power has an object-side surface 731 being convex in a paraxial region thereof, an image-side surface 732 being concave in a paraxial region thereof, and both the object-side surface 731 and the image-side surface 732 being aspheric. The third lens element 730 is made of plastic material.

The fourth lens element 740 with positive refractive power has an object-side surface 741 being convex in a paraxial region thereof, an image-side surface 742 being convex in a paraxial region thereof, both the object-side surface 741 and the image-side surface 742 being aspheric, and at least one inflection point on the object-side surface 741. The fourth lens element 740 is made of plastic material.

The fifth lens element 750 with negative refractive power has an object-side surface 751 being concave in a paraxial region thereof, an image-side surface 752 being concave in a paraxial region thereof, both the object-side surface 751 and the image-side surface 752 being aspheric, and at least one inflection point on the image-side surface 752. The fifth lens element 750 is made of plastic material.

The sixth lens element 760 with positive refractive power has an object-side surface 761 being convex in a paraxial region thereof, an image-side surface 762 being concave in a paraxial region thereof, both the object-side surface 761 and the image-side surface 762 being aspheric, and at least one inflection point on each of the object-side surface 761 and the image-side surface 762. The sixth lens element 760 is made of plastic material.

The optical imaging system further includes an IR cut filter 770 located between the sixth lens element 760 and an image surface 780. The IR cut filter 770 is made of glass material and will not affect the focal length of the optical imaging system. The image sensor 790 is disposed on or near the image surface 780 of the optical imaging system.

The detailed optical data of the 7th embodiment are shown in TABLE 13, and the aspheric surface data are shown in TABLE 14, wherein the units of the curvature radius, the thickness and the focal length are expressed in mm, and HFOV is a half of the maximal field of view.

TABLE 13

(7th Embodiment)
f = 5.87 mm, Fno = 1.45, HFOV = 23.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.298 | ASP | 1.800 | Plastic | 1.535 | 55.8 | 3.22 |
| 2 | | −4.989 | ASP | 0.135 | | | | |
| 3 | Ape. Stop | Plano | | 0.035 | | | | |
| 4 | Lens 2 | −3.190 | ASP | 0.239 | Plastic | 1.660 | 20.4 | −9.24 |
| 5 | | −6.892 | ASP | 0.033 | | | | |
| 6 | Lens 3 | 8.213 | ASP | 0.418 | Plastic | 1.535 | 55.8 | −13.13 |
| 7 | | 3.719 | ASP | 0.950 | | | | |
| 8 | Lens 4 | 71.522 | ASP | 0.428 | Plastic | 1.639 | 23.3 | 19.42 |
| 9 | | −14.975 | ASP | 0.052 | | | | |
| 10 | Lens 5 | −4.094 | ASP | 0.386 | Plastic | 1.583 | 30.2 | −4.20 |
| 11 | | 6.333 | ASP | 0.050 | | | | |
| 12 | Lens 6 | 3.871 | ASP | 1.175 | Plastic | 1.639 | 23.3 | 13.53 |
| 13 | | 6.180 | ASP | 0.300 | | | | |
| 14 | IR Cut Filter | Plano | | 0.210 | Glass | 1.517 | 64.2 | — |
| 15 | | Plano | | 0.400 | | | | |
| 16 | Image Surface | Plano | | — | | | | |

Note:
Reference wavelength is d-line 587.6 nm.
The effective radius of Surface 1 is 2.040 mm.
The effective radius of Surface 10 is 1.450 mm.

TABLE 14

Aspheric Coefficients

| | Surface # | | | |
|---|---|---|---|---|
| | 1 | 2 | 4 | 5 |
| k = | −1.4348E+00 | 4.5883E+00 | −8.4535E+00 | 1.8586E+01 |
| A4 = | 1.1686E−02 | 9.0062E−02 | 2.4532E−01 | 3.6569E−01 |
| A6 = | −1.3727E−03 | −5.4982E−02 | −2.0935E−01 | −2.3257E−01 |
| A8 = | 9.4671E−04 | 1.9638E−02 | 9.4525E−02 | 2.4508E−02 |
| A10 = | −2.8743E−04 | −3.6635E−03 | −2.0241E−02 | 3.8432E−02 |
| A12 = | 1.2894E−05 | 2.9011E−04 | 1.6875E−03 | −9.6868E−03 |
| A14 = | | | | |

| | Surface # | | | |
|---|---|---|---|---|
| | 6 | 7 | 8 | 9 |
| k = | −7.3764E+01 | −2.5767E+01 | −9.0000E+01 | −9.0000E+01 |
| A4 = | 1.9073E−01 | 3.5774E−02 | −1.0849E−01 | −2.8860E−01 |
| A6 = | −6.0886E−02 | 1.9839E−02 | 8.9753E−02 | 3.1155E−01 |
| A8 = | −8.5385E−02 | −4.7988E−02 | −1.7743E−01 | −3.3495E−01 |
| A10 = | 7.5586E−02 | 2.7582E−02 | 1.5057E−01 | 2.5458E−01 |
| A12 = | −1.5883E−02 | −6.1284E−03 | −8.4192E−02 | −1.1325E−01 |
| A14 = | | | 2.0751E−02 | 2.1213E−02 |

| | Surface # | | | |
|---|---|---|---|---|
| | 10 | 11 | 12 | 13 |
| k = | −1.1289E+01 | 4.3508E+00 | −3.8600E+01 | 5.3570E+00 |
| A4 = | −1.9500E−01 | −4.4463E−02 | −4.6507E−02 | −4.8517E−02 |
| A6 = | 2.2713E−01 | 1.2179E−02 | −2.2174E−02 | 4.0813E−03 |
| A8 = | −2.2484E−01 | 2.9818E−03 | 5.0590E−02 | 1.2076E−03 |
| A10 = | 1.7454E−01 | −6.4288E−03 | −3.4370E−02 | −8.2087E−04 |
| A12 = | −7.7825E−02 | 2.2137E−03 | 1.1690E−02 | 1.7149E−04 |
| A14 = | 1.3541E−02 | −2.5010E−04 | −1.9837E−03 | −1.1399E−05 |
| A16 = | | | 1.3282E−04 | −2.0650E−07 |

In the 7th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in the following table.

| 7th Embodiment | | | |
|---|---|---|---|
| f [mm] | 5.87 | BL/CT1 | 0.51 |
| Fno. | 1.45 | tan(HFOV) | 0.43 |
| HFOV [deg.] | 23.4 | TL [mm] | 6.61 |
| (V2 + V4 + V6)/(V1 + V3) | 0.60 | SL/TL | 0.71 |
| (V4 + V5 + V6)/(V1 + V3) | 0.69 | f/TL | 0.89 |
| (CT2 + CT3 + CT4 + CT5)/(CT1 + CT6) | 0.49 | EPD/ImgH | 1.55 |
| ΣAT/T34 | 1.32 | Y11/ImgH | 0.78 |
| (R6 + R7)/(R6 − R7) | −1.11 | Y11/Y62 | 0.94 |
| (R11 − R12)/(R11 + R12) | −0.23 | Yc62/f | 0.18 |
| |f1/f3| | 0.25 | TL/EPD | 1.63 |
| R1/CT1 | 1.28 | f/EPD | 1.45 |

The foregoing description, for purpose of explanation, has been described with references to specific embodiments. It is to be noted that TABLES 1-14 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system comprising six lens elements, the six lens elements being, in order from an object side to an image side: a first lens element, a second lens element, a third lens element, a fourth lens element, a fifth lens element and a sixth lens element;
wherein the first lens element has positive refractive power, the second lens element has negative refractive power, a reflective component is provided at the object side of the first lens element along an optical axis, each of the six lens elements has an object-side surface facing toward the object side and an image-side surface facing toward the image side, and at least one of the six lens elements comprises at least one inflection point;
wherein the optical imaging system has a total of six lens elements, an axial distance between the object-side surface of the first lens element and an image surface is TL, an entrance pupil diameter of the optical imaging system is EPD, a half of the maximal field of view of the optical imaging system is HFOV, and the following conditions are satisfied:

$1.0<TL/EPD<1.9;$ $0.20<\tan(HFOV)<0.50;$ and $3.0 \text{ [mm]}<TL<7.0 \text{ [mm]}.$ 2. The optical imaging system of claim 1, wherein the third lens element has negative refractive power, the object-side surface of the third lens element is convex in a paraxial region thereof and the image-side surface of the third lens element is concave in a paraxial region thereof.

3. The optical imaging system of claim 1, wherein there is an air gap between each of adjacent lens elements of the optical imaging system, a focal length of the first lens element is f1, a focal length of the third lens element is f3, and the following condition is satisfied:

$|f1/f3|<1.0.$

4. The optical imaging system of claim 1, wherein the image-side surface of the second lens element is concave in a paraxial region thereof, the image-side surface of the sixth lens element is aspheric and the object-side surface of the fifth lens element is concave in a paraxial region thereof.

5. The optical imaging system of claim 1, wherein the image-side surface of the sixth lens element is concave in a paraxial region thereof, the entrance pupil diameter of the optical imaging system is EPD, a maximum image height of the optical imaging system is ImgH, and the following condition is satisfied:

$1.15<EPD/ImgH<2.0.$

6. The optical imaging system of claim 1, wherein an axial distance between the image-side surface of the sixth lens element and the image surface is BL, a central thickness of the first lens element is CT1, and the following condition is satisfied:

$0.20<BL/CT1<0.90.$

7. The optical imaging system of claim 1, wherein a central thickness of the third lens element is smaller than a central thickness of the sixth lens element.

8. An optical imaging system comprising six lens elements, the six lens elements being, in order from an object side to an image side: a first lens element, a second lens element, a third lens element, a fourth lens element, a fifth lens element and a sixth lens element;
wherein each of the six lens elements has an object-side surface facing toward the object side and an image-side surface facing toward the image side, and at least one of the six lens elements comprises at least one inflection point;
wherein the optical imaging system has a total of six lens elements, the first lens element has positive refractive power, the second lens element has negative refractive power, an axial distance between the object-side surface of the first lens element and an image surface is TL, an entrance pupil diameter of the optical imaging system is EPD, a half of the maximal field of view of the optical imaging system is HFOV, a curvature radius of the object-side surface of the first lens element is R1, a central thickness of the first lens element is CT1, and the following conditions are satisfied:

$1.0<TL/EPD<1.9;$ $0.20<\tan(HFOV)<0.50;$ and $0.70<R1/CT1<1.50.$

9. The optical imaging system of claim 8, wherein the fifth lens element has negative refractive power.

10. The optical imaging system of claim 8, wherein there is an air gap between each of adjacent lens elements of the optical imaging system, the sixth lens element has positive refractive power.

11. The optical imaging system of claim 8, wherein the image-side surface of the sixth lens element is concave in a paraxial region thereof and the image-side surface of the sixth lens element has at least one convex shape in an off-axis region thereof.

12. The optical imaging system of claim 8, wherein the sixth lens element has at least one inflection point, a vertical distance between a maximum effective diameter position on the object-side surface of the first lens element and an optical axis is Y11, a maximum image height of the optical imaging system is ImgH, and the following condition is satisfied:

$0.65 < Y11/ImgH < 1.0$.

13. The optical imaging system of claim 8, wherein a central thickness of the first lens element is CT1, a central thickness of the second lens element is CT2, a central thickness of central thickness of the third lens element is CT3, a central thickness of the fourth lens element is CT4, a central thickness of the fifth lens element is CT5, a central thickness of the sixth lens element is CT6, and the following condition is satisfied:

$0.10 < (CT2+CT3+CT4+CT5)/(CT1+CT6) < 1.20$.

14. The optical imaging system of claim 8, wherein a sum of all axial distances between adjacent lens elements of the optical imaging system is ΣAT, an axial distance between the third lens element and the fourth lens element is T34, a vertical distance between a maximum effective diameter position on the object-side surface of the first lens element and an optical axis is Y11, a vertical distance between a maximum effective diameter position on the image-side surface of the sixth lens element and the optical axis is Y62, and the following conditions are satisfied:

$1.05 < \Sigma AT/T34 < 4.0$; and $0.80 < Y11/Y62 < 1.35$.

15. The optical imaging system of claim 8, further comprising a reflective element disposed on the object side of the first lens element along an optical axis direction, and the sixth lens element has at least one inflection point.

16. An imaging apparatus, comprising the optical imaging system of claim 8 and an image sensor disposed on the image surface of the optical imaging system.

17. An electronic device, comprising the imaging apparatus of claim 16.

18. An optical imaging system comprising six lens elements, the six lens elements being, in order from an object side to an image side: a first lens element, a second lens element, a third lens element, a fourth lens element, a fifth lens element and a sixth lens element;
wherein each of the six lens elements has an object-side surface facing toward the object side and an image-side surface facing toward the image side;
wherein the optical imaging system has a total of six lens elements, the first lens element has positive refractive power, the second lens element has negative refractive power, the image-side surface of the fifth lens element is aspheric, the image-side surface of the sixth lens element is aspheric, at least one of the six lens elements has at least one inflection point; a focal length of the optical imaging system is f, an entrance pupil diameter of the optical imaging system is EPD, an axial distance between the object-side surface of the first lens element and an image surface is TL, and the following conditions are satisfied:

$1.0 < f/EPD < 1.55$; and $0.80 < f/TL < 1.10$.

19. The optical imaging system of claim 18, wherein the third lens element has negative refractive power, the axial distance between the object-side surface of the first lens element and the image surface is TL, and the following condition is satisfied:

$3.0$ [mm]$< TL < 7.0$ [mm].

20. The optical imaging system of claim 18, wherein the image-side surface of the fifth lens element is concave in a paraxial region thereof.

21. The optical imaging system of claim 18, wherein there is an air gap between each of adjacent lens elements of the optical imaging system, a half of the maximal field of view of the optical imaging system is HFOV, and the following condition is satisfied:

$0.20 < \tan(HFOV) < 0.50$.

22. The optical imaging system of claim 18, wherein a curvature radius of the image-side surface of the third lens element is R6, a curvature radius of the object-side surface of the fourth lens element is R7, and the following condition is satisfied:

$-2.0 < (R6+R7)/(R6-R7) < 0$.

23. The optical imaging system of claim 18, wherein a vertical distance between an off-axial critical point on the image-side surface of the sixth lens element and an optical axis is Yc62, the focal length of the optical imaging system is f, and the following condition is satisfied:

$0.05 < Yc62/f < 0.70$.

24. The optical imaging system of claim 18, wherein a sum of all axial distances between adjacent lens elements of the optical imaging system is ΣAT, an axial distance between the third lens element and the fourth lens element is T34, and the following condition is satisfied:

$1.10 < \Sigma AT/T34 < 1.80$.

25. The optical imaging system of claim 18, wherein the sixth lens element has at least one inflection point, a curvature radius of the object-side surface of the sixth lens element is R11, a curvature radius of the image-side surface of the sixth lens element is R12, and the following condition is satisfied:

$-0.10 < (R11-R12)/(R11+R12) < 0.35$.

* * * * *